United States Patent
Kim et al.

(10) Patent No.: US 9,806,558 B2
(45) Date of Patent: Oct. 31, 2017

(54) WIRELESS CHARGING EQUIPMENT, TERMINAL, WIRELESS CHARGING SYSTEM COMPRISING THE SAME, CONTROL METHOD THEREOF AND NON-TRANSITORY COMPUTER READABLE STORAGE MEDIUM HAVING COMPUTER PROGRAM RECORDED THEREON

(71) Applicant: SK Planet Co., Ltd., Gyeonggi-do (KR)

(72) Inventors: Ki Cheol Kim, Seoul (KR); Yon Won Park, Gyeonggi-do (KR); Hyun Wook Kim, Gyeonggi-do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 154 days.

(21) Appl. No.: 14/894,961

(22) PCT Filed: Nov. 17, 2014

(86) PCT No.: PCT/KR2014/011017
§ 371 (c)(1),
(2) Date: Nov. 30, 2015

(87) PCT Pub. No.: WO2015/115723
PCT Pub. Date: Aug. 6, 2015

(65) Prior Publication Data
US 2016/0126776 A1    May 5, 2016

(30) Foreign Application Priority Data

Jan. 29, 2014 (KR) .................. 10-2014-0011175
Jun. 23, 2014 (KR) .................. 10-2014-0076761

(Continued)

(51) Int. Cl.
*H02J 7/00* (2006.01)
*H02J 7/02* (2016.01)
(Continued)

(52) U.S. Cl.
CPC ............. *H02J 7/025* (2013.01); *H02J 7/04* (2013.01); *H02J 17/00* (2013.01); *H02J 50/80* (2016.02);
(Continued)

(58) Field of Classification Search
CPC ........................................... H02J 7/025
(Continued)

(56) References Cited

U.S. PATENT DOCUMENTS

2014/0062395 A1* 3/2014 Kwon ............... H02J 50/60
                                                   320/108
2014/0285143 A1* 9/2014 Kwon ............... H02J 7/025
                                                   320/108
(Continued)

FOREIGN PATENT DOCUMENTS

KR    10-2011-0103294 A    9/2011
KR    10-2011-0103368 A    9/2011
(Continued)

OTHER PUBLICATIONS

International Search Report in PCT International Application No. PCT/KR2014/011017, dated Feb. 6, 2015.

*Primary Examiner* — Suresh Memula
(74) *Attorney, Agent, or Firm* — Fenwick & West LLP

(57) ABSTRACT

Provided are wireless charging equipment, a terminal, a wireless charging system comprising the same, a control method thereof, and a non-transitory computer readable storage medium having computer program recorded thereon. That is, the present invention can conveniently share contents on a cloud, enlarge an application range of the wireless (Continued)

charging system, and improve convenience of usage by transmitting sharing link information and identification information of one or more second terminals to the wireless charging equipment in a first terminal, verifying the access to a corresponding second terminal in the wireless charging equipment to provide the sharing link information to the corresponding second terminal, and storing the sharing link information in the second terminal or downloading contents corresponding to the sharing link information, in the case where the first terminal acquiring the sharing link information provided from the service providing device is charged in the wireless charging equipment.

7 Claims, 16 Drawing Sheets

(30) Foreign Application Priority Data

Jun. 23, 2014 (KR) ........................ 10-2014-0076765
Jun. 23, 2014 (KR) ........................ 10-2014-0076771

(51) Int. Cl.
| | | |
|---|---|---|
| *H02J 17/00* | (2006.01) | |
| *H04W 88/02* | (2009.01) | |
| *H04W 4/00* | (2009.01) | |
| *H04W 4/20* | (2009.01) | |
| *H02J 7/04* | (2006.01) | |
| *H02J 50/80* | (2016.01) | |

(52) U.S. Cl.
CPC ........... *H04W 4/008* (2013.01); *H04W 4/206* (2013.01); *H04W 88/02* (2013.01); *H02J 2007/0001* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 2014/0327393 A1* | 11/2014 | Lee | ........................ | H02J 7/025 320/108 |
| 2015/0244201 A1* | 8/2015 | Chu | ........................ | H02J 7/025 320/108 |
| 2015/0311743 A1* | 10/2015 | Chu | ........................ | H02J 7/025 320/108 |
| 2015/0372530 A1* | 12/2015 | Chu | ........................ | H02J 50/80 320/108 |

FOREIGN PATENT DOCUMENTS

| | | |
|---|---|---|
| KR | 10-2012-0049588 A | 5/2012 |
| KR | 10-2012-0108759 A | 10/2012 |

* cited by examiner

WIRELESS CHARGING EQUIPMENT, TERMINAL, WIRELESS CHARGING SYSTEM COMPRISING THE SAME, CONTROL METHOD THEREOF AND NON-TRANSITORY COMPUTER READABLE STORAGE MEDIUM HAVING COMPUTER PROGRAM RECORDED THEREON

CROSS-REFERENCE TO RELATED APPLICATION

This application is the U.S. national phase of PCT Application No. PCT/KR2014/011017 filed on Nov. 17, 2014, which claims the benefit of Korean Application Nos. 10-2014-0011175 filed on Jan. 29, 2014, 10-2014-0076761 filed on Jun. 23, 2014, 10-2014-0076765 filed on Jun. 23, 2014 and 10-2014-0076771 filed on Jun. 23, 2014 with the Korean Intellectual Property Office, the disclosures of which are incorporated herein by reference.

BACKGROUND OF THE INVENTION

1. Field of the Invention

The present invention relates to wireless charging equipment, a terminal, a wireless charging system comprising the same, a control method thereof and a non-transitory computer readable storage medium having a computer program recorded thereon, and particularly, to wireless charging equipment and a terminal in which when a first terminal acquiring sharing link information provided from a service providing device is charged in the wireless charging equipment, the first terminal transmits the sharing link information and identification information of one or more second terminals to the wireless charging equipment, the wireless charging equipment verifies the access to a corresponding second terminal to provide the sharing link information to the corresponding second terminal, and the second terminal keeps the sharing link information or downloads contents corresponding to the sharing link information, a wireless charging system comprising the same, a control method thereof and a non-transitory computer readable storage medium having a computer program recorded thereon.

2. Description of the Related Art

Wireless charging equipment (alternatively, a wireless power transmitting unit) is a power transferring device which wirelessly transfers power required for an electronic device.

The wireless charging equipment communicates with a terminal adjacent to the corresponding wireless charging equipment, and the corresponding wireless charging equipment transmits a charging signal to the corresponding terminal, the terminal charges a battery provided in the corresponding terminal based on the charging signal, and thus, there is an inefficient aspect in that services other than a battery charging function cannot be provided.

SUMMARY OF THE INVENTION

An object of the present invention is to provide wireless charging equipment, a terminal, a wireless charging system comprising the same, a control method thereof and a non-transitory computer readable storage medium having a computer program recorded thereon for easily sharing information on a remote place based on a wireless charging situation and a cloud service.

Another object of the present invention is to provide wireless charging equipment, a terminal, a wireless charging system comprising the same, a control method thereof and a non-transitory computer readable storage medium having a computer program recorded thereon for transmitting sharing link information and identification information of one or more second terminals to the wireless charging equipment in a first terminal, verifying the access to a corresponding second terminal in the wireless charging equipment to provide the sharing link information to the corresponding second terminal, and storing the sharing link information in the second terminal or downloading contents corresponding to the sharing link information, in the case where the first terminal acquiring the sharing link information provided from the service providing device is charged in the wireless charging equipment.

Yet another object of the present invention is to provide wireless charging equipment, a terminal, a wireless charging system comprising the same, a control method thereof, and a non-transitory computer readable storage medium having computer program recorded thereon for providing a coupon usable in a corresponding store to a second terminal which is charging in the wireless charging equipment, in the case where the first terminal getting a coupon provided from the service providing device is charged through the wireless charging equipment provided in the store.

Still another object of the present invention is to provide wireless charging equipment, a terminal, a wireless charging system comprising the same, a control method thereof, and a non-transitory computer readable storage medium having computer program recorded thereon for registering a coupon usable in a store where the corresponding wireless charging equipment is installed which is provided from a first terminal which is charging through the corresponding wireless charging equipment to a dedicated app installed in a second terminal in the second terminal which is charging through the wireless charging equipment.

Still yet another object of the present invention is to provide wireless charging equipment, a terminal, a wireless charging system comprising the same, a control method thereof, and a non-transitory computer readable storage medium having computer program recorded thereon for sharing data among a plurality of terminals which is charging through the wireless charging equipment.

Still yet another object of the present invention is to provide wireless charging equipment, a terminal, a wireless charging system comprising the same, a control method thereof, and a non-transitory computer readable storage medium having computer program recorded thereon for providing a method of directly exchanging mass data among the plurality of terminals which is charging through the wireless charging equipment.

Still yet another object of the present invention is to provide wireless charging equipment, a terminal, a wireless charging system comprising the same, a control method thereof, and a non-transitory computer readable storage medium having computer program recorded thereon for transmitting contents while being reproduced in a first terminal by performing connection with a second terminal, in the case where identification information of the detected second terminal is identification information pre-registered in the first terminal to share the contents when a connectable second terminal is detected while the identification information is pre-registered between terminals.

Still yet another object of the present invention is to provide wireless charging equipment, a terminal, a wireless charging system comprising the same, a control method thereof, and a non-transitory computer readable storage medium having a computer program recorded thereon for selecting an optimal second terminal and performing connection with the selected second terminal by comparing a content reproduction condition for reproducing contents and a predetermined connection condition corresponding to each second terminal, when a plurality of connectable second terminals is detected.

According to an aspect of the present invention, wireless charging equipment includes: a communication unit configured to communicate based on a BLE scheme and receive sharing link information transmitted from a first terminal, sharing target information, and identification information of the first terminal; and a control unit configured to determine whether identification information of a second terminal is included in the sharing target information when the identification information of the second terminal transmitted from the second terminal is received while the first terminal is wirelessly charging and control the communication unit to transmit the sharing link information to the second terminal when the identification information of a second terminal is included in the sharing target information.

Preferably, the sharing link information may include address information of the service providing device in which a content selected by the first terminal from a plurality of contents pre-stored in the service providing device is stored.

Preferably, the sharing target information may include any one of the identification information of one or more second terminals, a telephone number, and an e-mail address.

Preferably, the control unit may control to delete or store the identification information of the second terminal and simultaneously, continuously perform a charging function with the second terminal when the identification information of the second terminal is not included in the sharing target information.

According to another aspect of the present invention, a first terminal includes: a communication unit configured to communicate with a service providing device; and a control unit configured to control the communication unit to select one or more contents among a plurality of contents prestored in the service providing device and receive sharing link information on the selected content provided from the service providing device and control the communication unit to select sharing target information to share the sharing link information and transmit the sharing link information, the sharing target information, and the identification information of the first terminal to the wireless charging equipment when the first terminal including the communication unit exists in a BLE range of the wireless charging equipment.

According to yet another aspect of the present invention, a second terminal includes: a communication unit configured to communicate with wireless charging equipment and transmit identification information to the wireless charging equipment; and a control unit configured to control the communication unit to receive sharing link information transmitted from the wireless charging equipment in response to the transmitted identification information of the second terminal including the communication unit and communicate with the service providing device corresponding to the sharing link information based on the received sharing link information and control the communication unit to request the transmission of the content corresponding to the sharing link information to the service providing device and receive the content corresponding to the sharing link information transmitted from the service providing device in response to the request.

According to still another aspect of the present invention, a control method of wireless charging equipment includes: receiving sharing link information transmitted from a first terminal, sharing target information, and identification information of the first terminal by means of a communication unit; determining whether identification information of a second terminal is included in the sharing target information when receiving the identification information of the second terminal transmitted from the second terminal while the first terminal is wirelessly charging, by means of a control unit; and transmitting the sharing link information to the second terminal by means of the communication unit, when the identification information of the second terminal is included in the sharing target information as the determined result.

According to still yet another aspect of the present invention, a control method of a first terminal includes: communicating with a service providing device by means of a communication unit; selecting one or more contents among a plurality of contents prestored in the service providing device by means of a control unit; receiving sharing link information on the selected content provided from the service providing device by means of the communication unit; selecting sharing target information to share the sharing link information by means of the control unit; and transmitting the sharing link information, the sharing target information, and the identification information of the first terminal to the wireless charging equipment by means of the communication unit, when the first terminal including the communication unit exists in a BLE range of the wireless charging equipment.

According to still yet another aspect of the present invention, a control method of a second terminal includes: transmitting identification information of a second terminal including a communication unit to wireless charging equipment by means of the communication unit; receiving sharing link information transmitted from the wireless charging equipment in response to the transmitted identification information of the second terminal by means of the communication unit; controlling the communication unit to communicate with a service providing device corresponding to the sharing link information based on the sharing link information by means of the control unit; requesting transmission of a content corresponding to the sharing link information to the service providing device by means of the control unit; receiving the content corresponding to the sharing link information transmitted from the service providing device in response to the request by means of the communication unit; and displaying the received content corresponding to the sharing link information through a dedicated app by means of the control unit.

According to still yet another aspect of the present invention, a computer program executing the methods according to the aforementioned embodiments may be stored in a non-transitory computer readable storage medium having a computer program recorded thereon.

According to still yet another aspect of the present invention, a wireless charging system includes: a service providing device configured to transmit sharing link information on a selected content when one or more contents are selected from a plurality of prestored contents; a first terminal configured to transmit sharing link information transmitted from the service providing device, sharing target information including information on one or more second terminals to share the sharing link information, and identification information; wireless charging equipment configured to determine whether the identification information of the second terminal is included in the sharing target information when the identification information of the second terminal transmitted from the second terminal is received while the first terminal is wirelessly charging and transmit the sharing link information to the second terminal when the identification information of the second terminal is included in the sharing target information; and a second terminal configured to communicate with the service providing device corresponding to the sharing link information based on the sharing link information transmitted from the wireless charging equipment, request transmission of the content corresponding to the sharing link information to the service providing device, receive the content corresponding to the sharing link information transmitted from the service providing device in response to the request, and output the received content.

Preferably, the content may include at least one of an image, an audio, a video, a motion picture, a game, map information provided from a map providing program, and a document file.

According to still yet another aspect of the present invention, a first terminal includes: a communication unit configured to communicate with first wireless charging equipment based on a BLE scheme and receive information on one or more terminals which is charging through the first wireless charging equipment transmitted from the first wireless charging equipment and identification information of the first wireless charging equipment; and a control unit configured to control the communication unit to select one coupon among a plurality of coupons registered in a preinstalled specific app, verify whether the selected coupon is a coupon usable in a store where the first wireless charging equipment is provided when a predetermined button is selected, and as the verified result, when the selected coupon is usable in the store, transmit coupon information of the coupon, identification information of the first wireless charging equipment, and identification information of the first terminal including the communication unit to the remaining terminals except for the first terminal in the received information on one or more terminals which is charging through the first wireless charging equipment, respectively.

According to still yet another aspect of the present invention, wireless charging equipment includes: a communication unit configured to communicate based on a BLE scheme and receive a charging terminal information request signal transmitted from a first terminal which is charging; and a control unit configured to control the communication unit to verify one or more terminals which is charging including the first terminal, verify information on the verified one or more terminals including at least one of identification information, a telephone number, and an e-mail address, and transmit the information on the verified one or more terminals to the first terminal.

According to still yet another aspect of the present invention, a terminal includes: an access unit configured to detect one or more connectable second terminals and support connection; a storage unit configured to store a connection condition for establishing the connection in response to each of one or more second terminals; and a control unit configured to verify a predetermined connection condition through the storage unit in response to each of the second terminals when the plurality of second terminals connectable through the access unit is detected and then compare the verified connection condition with a content reproduction condition to select an optimal second terminal and control connection to be established through the selected second terminal and the access unit.

As described above, according to the present invention, it is possible to conveniently share contents (for example, including multimedia contents, a business card, profile information, and the like) on a cloud by easily sharing information on a remote place based on a wireless charging situation and a cloud service.

Further, it is possible to enlarge an application range of the wireless charging system and improve convenience of usage by transmitting sharing link information and identification information of one or more second terminals to the wireless charging equipment in a first terminal, verifying the access to a corresponding second terminal in the wireless charging equipment to provide the sharing link information to the corresponding second terminal, and storing the sharing link information in the second terminal or downloading contents corresponding to the sharing link information, in the case where the first terminal acquiring the sharing link information provided from the service providing device is charged in the wireless charging equipment.

Further, it is possible to increase an advertisement effect and increase sales according to substantial purchase by providing a coupon usable in a corresponding store to a second terminal which is charging in the wireless charging equipment, in the case where the first terminal getting a coupon provided from the service providing device is charged through the wireless charging equipment provided in the store to induce friends including the first terminals to the store where the wireless charging equipment is provided.

Further, it is possible to enlarge an application range of the wireless charging system and improve convenience of usage by registering a coupon usable in a store where the corresponding wireless charging equipment is installed which is provided from a first terminal which is charging through the corresponding wireless charging equipment to a dedicated app installed in a second terminal in the second terminal which is charging through the wireless charging equipment.

Further, it is possible to conveniently share the content stored in the first terminal, enlarge an application range of the wireless charging system and improve convenience of usage, by sharing data among a plurality of terminals which is charging through the wireless charging equipment.

Further, it is possible to enhance usability by providing a method of directly exchanging mass data among the plurality of terminals which is charging through the wireless charging equipment to efficiently share information and share a file among many terminals of the same user.

Further, it is possible to increase user convenience by performing connection with a second terminal, in the case where identification information of the second terminal is identification information pre-registered in the first terminal to share the contents when a connectable second terminal is detected while the identification information is pre-registered between terminals to more easily share the contents among the terminals.

Further, it is possible to reproduce the contents under an optimal condition by selecting an optimal second terminal and performing connection with the selected second terminal by comparing a content reproduction condition for reproducing contents and a predetermined connection condition corresponding to each second terminal, when a plurality of connectable second terminals is detected.

DETAILED DESCRIPTION OF THE PREFERRED EMBODIMENTS

Figure 1:
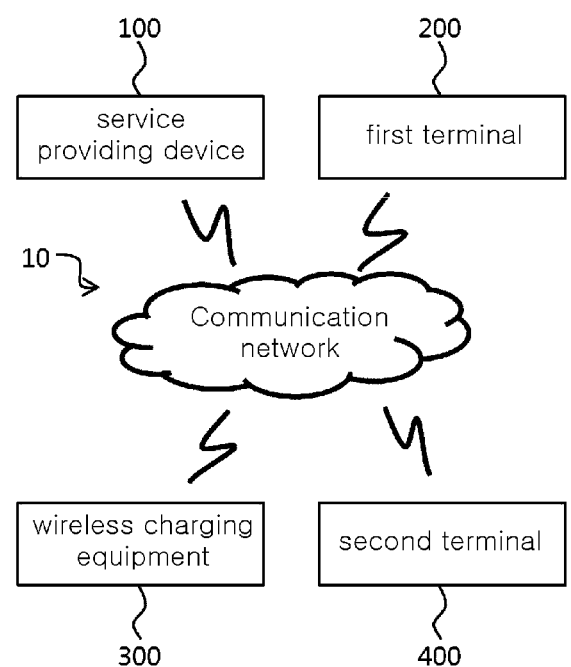
FIG. 1 is a block diagram illustrating a configuration of a wireless charging system according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included. In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a wireless charging system 10 according to an embodiment of the present invention.

As illustrated in FIG. 1, the wireless charging system 10 is constituted by a service providing device 100, a first terminal 200, wireless charging equipment 300, and a second terminal 400. All the constituent elements of the wireless charging system 10 illustrated in FIG. 1 are not required constituent elements, and the wireless charging system 10 may be implemented by more constituent elements than the constituent elements illustrated in FIG. 1 or less constituent elements therethan. Here, the wireless charging equipment 300 and the first terminal 200 charge a battery provided in the corresponding first terminal 200 based on a charging signal transmitted from the wireless charging equipment 300 through alliance for wireless power (A4WP) scheme (alternatively, a magnetic resonance scheme). Further, the corresponding wireless charging equipment 300 and the first terminal 200 uses BLE for low power in Bluetooth.

While the first terminal 200 stores sharing link information and sharing target information corresponding to one or more contents provided from the service providing device 100, when the corresponding first terminal 200 communicates with the wireless charging equipment 300, the wireless charging equipment 300 receives the sharing link information, the sharing target information, and the like transmitted from the first terminal 200 and stores the corresponding information. Thereafter, when identification information of the second terminal 400 transmitted from the second terminal 400 through a dedicated app is included in the prestored sharing target information, the wireless charging equipment 300 transmits the sharing link information to the second terminal 400. Thereafter, the second terminal 400 communicates with the service providing device 100 corresponding to the sharing link information, receives contents corresponding to the sharing link information provided from the corresponding service providing device 100, and stores or outputs the received contents.

Figure 2:
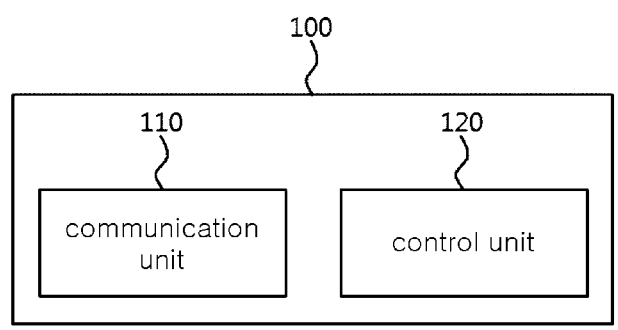
FIG. 2 is a block diagram illustrating a configuration of a service providing device according to the embodiment of the present invention.

As illustrated in FIG. 2, the service providing device 100 is constituted by a communication unit 110 and a control unit 120. All of the constituent elements of the service providing device 100 illustrated in FIG. 2 are not essential constituent elements, and the service providing device 100 may be implemented by more constituent elements than the constituent elements illustrated in FIG. 2 or less constituent elements therethan.

The communication unit 110 communicates with the first terminal 200, the wireless charging equipment 300, the second terminal 400, and the like by a wired/wireless communication method. In this case, when communicating with the first terminal 200 or the second terminal 400, the communication unit 110 may communicate with the first terminal 200, the wireless charging equipment 300, the second terminal 400, and the like using a Bluetooth low energy (BLE) scheme by using BLE.

Further, the communication unit 110 transmits sharing link information corresponding to one (alternatively, one or more/a plurality of) content(s) selected from a plurality of pre-stored contents to the first terminal 200 by a control of the control unit 120.

The control unit 120 executes an overall control function of the service providing device 100.

Further, the control unit 120 controls the plurality of contents to be prestored in a storage unit (not illustrated). Here, the corresponding contents may be files (for example, including images, audios, videos, motion pictures, games, map information provided from a map providing program, documents, and the like) and also be a folder (alternatively, folder information) including one or more files.

Further, when one (alternatively, one or more/a plurality of) content(s) is selected by the control of the first terminal 200 (alternatively, user's selection of the first terminal 200) among the plurality of contents prestored in the storage unit, the control unit 120 transmits the sharing link information corresponding to selected one (alternatively, one or more/a plurality of) content(s) to the corresponding first terminal 200 through the communication unit 110. Here, the sharing link information includes address information (for example, including URL information and the like) in which the corresponding contents are stored in the corresponding service providing device 100 (alternatively, address information in which the corresponding contents are stored in the storage unit).

Further, the control unit 120 communicates the second terminal 200 requesting the communication based on the sharing link information through the communication unit 110.

Further, when the second terminal 400 requests the transmission of the contents corresponding to the corresponding sharing link information based on the corresponding sharing link information, the control unit 120 transmits the contents corresponding to the corresponding sharing link information to the second terminal 400 through the communication unit 110.

Further, the control unit 120 stores sharing state information as big data for providing an additional service. Here, the corresponding sharing state information includes identification information of the first terminal 200 related with the sharing state information, identification information of the second terminal 400, sharing link information (alternatively, sharing target), a sharing time, and the like. Further, when the first terminal 200 or the second terminal 400 visits a predetermined store, the sharing state information stored in the storage unit may be used as big data for providing an additional service from the service providing device 100.

Further, the control unit 120 generates additional service information for each terminal based on the sharing state information.

Further, the control unit 120 transmits the generated additional service information to the first terminal 200 or the second terminal 400 through the wireless charging equipment 300. Here, the additional service information includes various contents curation such as promotion information for each store provided with the wireless charging equipment 300, coupon information, marketing information, review information for each product, news information, and music information.

Further, when a purchase function (alternatively, a payment function) for a specific product included in the additional service information transmitted to the first terminal 200 or the second terminal 400 is requested, the control unit 120 may also perform the purchase function for the corresponding product by interlocking among the wireless charging equipment 300, the first terminal 200 (alternatively, the second terminal 400), and a POS terminal (not illustrated).

Figure 3:
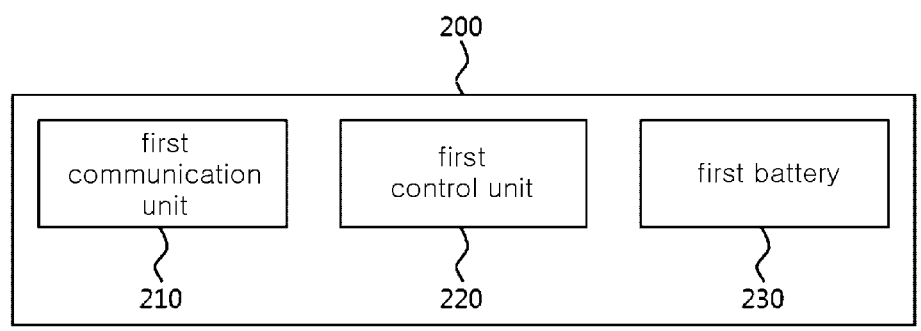
FIG. 3 is a block diagram illustrating a configuration of a first terminal according to the embodiment of the present invention.

As illustrated in FIG. 3, the first terminal 200 is constituted by a first communication unit 210, a first control unit 220, and a first battery 230. All the constituent elements of the first terminal 200 illustrated in FIG. 3 are not essential constituent elements, and the first terminal 200 may be implemented by more constituent elements than the constituent elements illustrated in FIG. 3 or less constituent elements therethan. Here, the first terminal 200 includes a power receiving unit (PRU) (not illustrated).

The first communication unit 210 communicates with the second terminal using the BLE scheme by using the BLE. Further, the first communication unit 210 receives a power beacon signal transmitted from the wireless charging equipment 300.

The first control unit 220 executes an overall control function of the first terminal 200.

Further, the first control unit 220 communicates with the service providing device 100 through the first communication unit 210.

Further, the first control unit 220 selects one (alternatively, one or more/a plurality of) content(s) among the plurality of contents prestored in the service providing device 100 (alternatively, provided from the service providing device 100). Here, the corresponding contents may be files (for example, including images, audios, videos, motion pictures, games, map information provided from a map providing program, documents, and the like) and also be a folder (alternatively, folder information) including one or more files.

Further, the first control unit 220 receives sharing link information on the corresponding selected contents provided (alternatively, transmitted) from the service providing device 100 through the first communication unit 210. Here, the sharing link information includes address information in which the corresponding contents are stored in the corresponding service providing device 100 (alternatively, address information of the service providing device 100 in which the corresponding contents are stored, and the like).

Further, the first control unit 220 stores the received sharing link information in a first storage unit (not illustrated).

Further, the first control unit 220 selects sharing target information to share the corresponding sharing link information. Here, the sharing target information includes information (for example, including identification information, a telephone number, an e-mail address, and the like) on one or more (alternatively, a plurality of) second terminals 400.

That is, the first control unit 220 selects sharing target information to share the corresponding sharing link information in information (for example, including identification information, a telephone number, an e-mail address, and the like) on the plurality of second terminals 400 prestored in the first storage unit (alternatively, according to user's selection/control of the first terminal 200.

Further, the first control unit 220 transmits the control signal (for example, the PRU advertisement signal) to the wireless charging equipment 300 through the first communication unit 210 in order to request connection (alternatively, communication) with the corresponding wireless charging equipment 300 based on the power beacon signal transmitted from the wireless charging equipment 300, in the A4WP scheme wireless charging.

Further, the first control unit 220 establishes the connection (alternatively, communication) with the corresponding wireless charging equipment 300 based on the transmitted control signal.

Further, the first control unit 220 transmits a control signal (alternatively, a charging signal transmission request signal) (for example, including a PRU dynamic parameter) to the wireless charging equipment 300 at a predetermined time interval.

Further, the first control unit 220 controls a charging signal transmitted from the wireless charging equipment 300 to be received through the first communication unit 210 at the predetermined time interval. In this case, the first control unit 220 may also control the charging signal transmitted from the wireless charging equipment 300 to be received through the first communication unit 210 in response to the above-transmitted control signal (for example, including the PRU dynamic parameter).

Further, the first control unit 220 charges the first battery 230 based on the received charging signal. In this case, the first terminal 220 may further include an additional constituent element for charging the corresponding first battery 230 by a resonance coupling method with the wireless charging equipment 300.

As such, when the first terminal 200 exists in a BLE range of the wireless charging equipment 300, the first control unit 220 communicates with the wireless charging equipment 300. Further, the first control unit 220 charges the first battery 230 included in the first terminal 200 based on the charging signal transmitted from the wireless charging equipment 300.

Further, the first control unit 220 transmits the sharing link information, the sharing target information, the identification information of the first terminal 200, and the like to the wireless charging equipment 300 while communicating through the first communication unit 210. In this case, the first control unit 220 may transmit the corresponding sharing link information, the sharing target information, the identification information of the first terminal 200, and the like to the wireless charging equipment 300 in an empty time period (alternatively, a standby time period) in which the charging signal is not transmitted to and received from the wireless charging equipment 300. In this case, the identification information of the first terminal 200 includes a mobile directory number (MDN), a mobile IP, a mobile MAC, subscriber identification module (Sim) card unique information, a serial number, and the like. Further, the identification information of the first terminal 200 may also include an international mobile subscriber identity (IMSI) of a USIM provided in the first terminal 200, a unique international mobile equipment identity (IMEI) of the first terminal 200, and the like. In this case, the IMSI includes a mobile country code (MCC), a mobile network code (MNC), a mobile subscriber identity (MSI), a country mobile subscriber identifier number (MSIN), and the like. Further, the IMEI includes a unique serial number of the terminal, a manufacturer of the terminal, model information, and the like.

As such, the first terminal 200 provides (alternatively, transmits) the sharing target information which is a target to be shared to the wireless charging equipment 300 together with the sharing link information which intends to be shared.

The first battery 230 supplies the power to the corresponding first terminal 200.

Further, the first battery 230 performs a charging function based on the charging signal transmitted from the wireless charging equipment 300 by a control of the first control unit 220.

Figure 4:
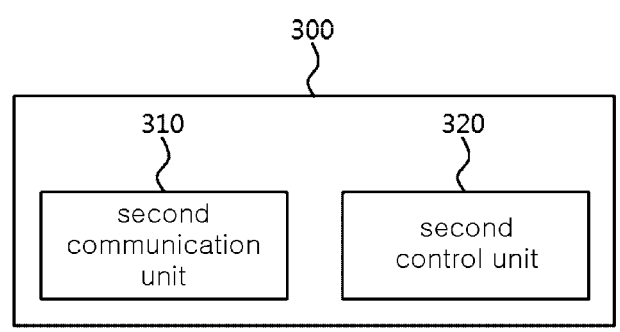
FIG. 4 is a block diagram illustrating a configuration of wireless charging equipment according to the embodiment of the present invention.

As illustrated in FIG. 4, the wireless charging equipment 300 (alternatively, a power transmitting unit PTU) is constituted by a second communication unit 310 and a second control unit 320. All the constituent elements of the wireless charging equipment 300 illustrated in FIG. 4 are not required constituent elements, and the wireless charging equipment 300 may be implemented by more constituent elements than the constituent elements illustrated in FIG. 4 or less constituent elements therethan.

The second communication unit 310 communicates with the service providing device 100, the first terminal 200, the second terminal 400, and the like using the BLE scheme by using the BLE. In this case, the second communication unit 310 transmits the identification information of the wireless charging equipment 300 to the service providing device 100, the first terminal 200, the second terminal 400, and the like by the control of the second control unit 320.

Further, the second communication unit 310 transmits a power beacon signal for communicating with the first terminal, the second terminal 400, and the like using the BLE scheme by the control of the second control unit 320. The second control unit 320 executes an overall control function of the wireless charging equipment 300.

Further, the second control unit 320 generates the power beacon signal at a predetermined time interval, in the A4WP scheme wireless charging.

Further, the second control unit 320 transmits the generated power beacon signal through the second communication unit 310 at the predetermined time interval.

Further, the second control unit 320 receives a control signal (alternatively, a PRU advertisement signal) transmitted from the first terminal 200 or the second terminal 400 receiving the corresponding power beacon signal through the second communication unit 310 in response to the transmitted power beacon signal.

Further, the second control unit 320 communicates with the first terminal 200 or the second terminal 400 adjacent to the corresponding wireless charging equipment 300 based on the received control signal.

Further, the second control unit 320 schedules a time for transmitting the corresponding charging signal to one or more first terminals 200 (alternatively, second terminals 400) connected with the corresponding wireless charging equipment 300 in a time slot (alternatively, a time sequence/a total data transmittable time), in order to transmit the charging signal to one or more first terminals 200 (alternatively, second terminals 400) connected with the corresponding wireless charging equipment 300.

Further, the second control unit 320 controls an inductor (not illustrated) and a capacitor (not illustrated) included in the wireless charging equipment 300 to generate the charging signal. In this case, the wireless charging equipment 300 generates a charging signal for wireless charging by a resonance coupling scheme.

Further, the second control unit 320 transmits the charging signal generated based on the scheduled time slot to specific terminals (for example, including the first terminal 200, the second terminal 400, and the like) among the terminals connected to the corresponding wireless charging equipment 300 at the predetermined time interval (for example, 250 ms).

In this case, in the case of a plurality of first terminals 200 connected to the corresponding wireless charging equipment 300, the second control unit 320 may individually generate a charging signal which is transmitted to each of the plurality of first terminals 200 and transmit the individually generated charging signal to each corresponding first terminal 200. Further, in the case of the plurality of first terminals 200 connected to the corresponding wireless charging equipment 300, the second control unit 320 may generate one charging signal which is transmitted to each of the plurality of first terminals 200 and transmit one generated charging signal to each of the plurality of first terminals 200.

Further, the second control unit 320 may also transmit the charging signal to the corresponding first terminal 200 or second terminal 400 based on a control signal (alternatively, a charging signal transmission request signal) (for example, including a PRU dynamic parameter) transmitted from the first terminal 200 or the second terminal 400.

Further, the second control unit 320 receives the sharing link information, the sharing target information, the identification information of the first terminal 200, and the like which are transmitted from the first terminal 200, through the second communication unit 310. Here, the sharing link information includes address information in which the contents are stored in the service providing device 100, and the like. Further, the sharing target information includes information (for example, including identification information, a telephone number, an e-mail address, and the like) on one or more (alternatively, a plurality of) second terminals 400.

Further, the second control unit 320 stores the received sharing link information, sharing target information, identification information of the first terminal 200, and the like in a second storage unit (not illustrated).

Further, while the corresponding first terminal 200 is charging by the charging signal provided from the wireless charging equipment 300 by interlocking the first terminal 200 and the wireless charging equipment 300, the second control unit 320 receives the identification information (alternatively, the information on the second terminal 400) of the second terminal 400 transmitted from the second terminal 400 through the second communication unit 310. Here, the communication method between wireless charging equipment 300 and the second terminal 400 may be any one of wired/wireless communication methods. In this case, the second terminal 400 communicates with (alternatively, accesses) the wireless charging equipment 300 through the dedicated app pre-installed in the corresponding second terminal 400 and may transmit the identification information of the corresponding second terminal 400 to the wireless charging equipment 300.

Further, the second control unit 320 determines (alternatively, verifies) whether the identification information of the second terminal 400 is included in the sharing target information pre-stored in the second storage unit.

That is, the second control unit 320 determines whether the second terminal 400 is included in the sharing target information to share the sharing link information.

As the determined result, when the identification information of the second terminal 400 is not included in the pre-stored sharing target information, the second control unit 320 deletes (alternatively, discards) or stores the identification information of the second terminal 400. In this case, the wireless charging equipment 300 continuously performs the charging function with the first terminal 200.

Further, as the determined result, when the identification information of the second terminal 400 is included in the pre-stored sharing target information, the second control unit 320 transmits the stored sharing link information to the second terminal 400 through the second communication unit 310. In this case, the wireless charging equipment 300 continuously performs the charging function with the first terminal 200.

Further, even when the charging for the corresponding first battery 230 is completed (alternatively, stops) by interlocking between the wireless charging equipment 300 and the first terminal 200 (alternatively, when the corresponding first terminal 200 is in a non-contact state with the wireless charging equipment 300), as long as the second terminal 400 is positioned within a service radius of the wireless charging equipment 300 (alternatively, as long as the second terminal 400 is positioned in the store where the wireless charging equipment 300 is provided), the content sharing function may be continuously performed by interlocking the wireless charging equipment 300 and the second terminal 400.

The second terminal 400 may include like constituent elements as the first terminal 200 (for example, including the first communication unit 210, the first control unit 220, the first battery 230, and the like).

Further, the second terminal 400 communicates with the wireless charging equipment 300. Here, the communication method between wireless charging equipment 300 and the second terminal 400 may be any one of wired/wireless communication methods. In this case, the second terminal 400 communicates with (alternatively, accesses) the wireless charging equipment 300 through the dedicated app pre-installed in the corresponding second terminal 400 and may transmit the identification information of the corresponding second terminal 400 to the wireless charging equipment 300.

Further, the second terminal 400 transmits the identification information of the second terminal 400 (alternatively, information on the second terminal 400) to the wireless charging equipment 300 while communicating. In this case, the wireless charging equipment 300 may be performing the charging function by interlocking with the first terminal 200.

Further, the second terminal 400 receives the sharing link information transmitted from the wireless charging equipment 300 in response to the identification information of the second terminal 400 (alternatively, the information on the second terminal 400).

Further, the second terminal 400 stores the received sharing link information.

Further, the second terminal 400 communicates with the service providing device 100 related with the corresponding sharing link information based on the received sharing link information.

Further, the second terminal 400 requests the transmission of the contents corresponding to the corresponding sharing link information to the service providing device 100 based on the corresponding sharing link information.

Further, the second terminal 400 receives the contents corresponding to the corresponding sharing link information transmitted from the service providing device 100 in response to the request.

Further, the second terminal 400 outputs (alternatively, outputs through the dedicated app) or stores the received contents.

Further, the second terminal 400 may store (alternatively, shares) the received contents in a social network account or a sharing server (for example, a cloud server) interlocking with the corresponding second terminal 400.

As such, information of a remote place may be easily shared based on the wireless charging situation and the cloud service.

Further, as such, in the case where the terminal acquiring the sharing link information provided from the service providing device is charged in the wireless charging equipment, the terminal transmits sharing link information and identification information of one or more second terminals to the wireless charging equipment, the wireless charging equipment verifies the access to a corresponding second terminal in the wireless charging equipment to provide the sharing link information to the corresponding second terminal, and the second terminal may store the sharing link information or download the contents corresponding to the sharing link information.

Further, while the first terminal 200 is storing the coupon issued from the service providing device 100 or a coupon server (not illustrated), when the corresponding first terminal 200 communicates with the wireless charging device 300, after the first terminal 200 acquires the information on the second terminal 400 which is charging through the wireless charging device 300, the first terminal 200 shares (alternatively, issues/provides) the coupon to the corresponding second terminal 400 based on the information on the second terminal 400. Thereafter, with respect to the coupon shared from the first terminal 200, the identification information of the wireless charging equipment included in the corresponding coupon coincides with the identification information of the wireless charging equipment while the corresponding second terminal 400 is charging, the corresponding second terminal 400 registers (alternatively, stores) the coupon shared from the first terminal 200 in the dedicated app installed in the second terminal 400.

The communication unit 110 transmits (alternatively, issues/provides) the coupon to the first terminal 200, the second terminal 400, and the like by the control of the control unit 120.

The control unit 120 issues the corresponding coupon provided (alternately, issued) from an affiliated company service device (not illustrated) corresponding to a coupon issuance request in response to the coupon issuance request of the first terminal 200.

Further, the control unit 120 generates the coupon corresponding to the coupon issuance request (alternatively, receives the corresponding coupon provided from the corresponding affiliated company service device) in response to the coupon issuance request of the first terminal 200 and may issue the corresponding coupon to the first terminal 200 corresponding to the MDN (alternatively, the identification information) included in the coupon issuance request. Here, the coupon includes coupon information including a coupon issuance affiliated company title (alternatively, a brand/an affiliated company name), a coupon name, a unique code (alternatively, a coupon number), a title, a benefit, a usage place, a usage period (alternatively, an expiration date), a usage method, a coupon type (for example, a free coupon or a paid coupon), a store name capable of using the corresponding coupon (alternatively, identification information of one or more (alternatively, a plurality of) wireless charging equipment which may use the corresponding coupon), and the like. In this case, the corresponding coupon may be a coupon usable in a specific store (alternatively, a coupon usable in a state adjacent to the specific wireless charging equipment) based on the store name capable of using the corresponding coupon (alternatively, identification information of one or more (alternatively, a plurality of) wireless charging equipment which may use the corresponding coupon) included in the coupon information.

Further, when the corresponding coupon is issued (alternatively, provided) to the first terminal 200, the control unit 120 may issue the coupon to the corresponding first terminal 200 through the predetermine dedicated app and issue the coupon to the corresponding first terminal 200 in an SMS format, a push message format, an e-mail format, a QR code format, and the like.

Such a coupon generating and issuing function may be performed by a coupon server (not illustrated).

Further, when the coupon issued to the first terminal 200 is additionally issued (alternatively, shared) to one or more second terminals 400 through the corresponding first terminal 200, the control unit 120 receives coupon transfer completion information transmitted from the second terminal 400 which additionally gets the corresponding coupon. Here, the coupon transfer completion information includes information representing that the issuance of the corresponding coupon is completed, the identification information of the second terminal 400, the identification information of the first terminal 200, the identification information of the wireless charging equipment 300, the coupon information, and the like.

Further, the control unit 120 stores the received coupon transfer completion information as big data for providing an additional service. Further, when the corresponding first terminal 200 or the second terminal 400 visits a predetermined store, the stored coupon transfer completion information may be used as big data for providing the additional service from the service providing device 100.

Further, the control unit 120 generates additional service information for each terminal based on the coupon transfer completion information.

Further, the control unit 120 transmits the generated additional service information to the corresponding first terminal 200 or second terminal 400 through the wireless charging equipment 300. Here, the additional service information includes various contents curation such as promotion information for each store provided with the wireless charging equipment 300, coupon information, marketing information, review information for each product, news information, and music information.

Further, when a purchase function (alternatively, a payment function) for a specific product included in the additional service information transmitted to the first terminal 200 or second terminal 400 is requested, the control unit 120 may also perform the purchase function for the corresponding product by interlocking among the wireless charging equipment 300, the first terminal 200 (alternatively, the second terminal 400), and a POS terminal (not illustrated).

Further, the control unit 124 counts the issuance number of times of the corresponding coupon based on the received coupon transfer completion information.

Further, when the counted issuance number of times exceeds a predetermined number of times (for example, 100 times), the control unit 120 upgrades the corresponding coupon to a new coupon (for example, upgrades an existing free coupon of a cup of Americano to a free coupon of a cup of café mocha) to provide the upgraded new coupon to the first terminal (alternatively, the second terminal) additionally getting the corresponding coupon.

As such, when the corresponding coupon is continuously and additionally issued by interlocking between the first terminal 200 and the second terminal 300, the control unit 120 may be configured to upgrade the corresponding coupon.

The first control unit 220 communicates with the service providing device 100 (alternatively, the coupon server) through the first communication unit 210.

Further, the first control unit 220 selects one (alternatively, one or more/a plurality of) coupon information among the plurality of coupon information (alternatively, coupons) provided from the service providing device 100 (alternatively, the coupon server) and transmits the coupon issuance request (alternatively, the coupon issuance request signal) for the issuance request of the coupon corresponding to the selected coupon information to the service providing device 100 (alternatively, the coupon server) through the first communication unit 210.

Further, the first control unit 220 stores (alternatively, registers/interlocks) the coupon issued from the service providing device 100 (alternatively, the coupon server) in a predetermined menu (alternatively, a category) of a specific app such as an electronic wallet app pre-installed (alternatively, provided/included) in the first terminal 200 in response to the coupon issuance request. Here, the corresponding coupon includes coupon information including a coupon issuance affiliated company title (alternatively, a brand/an affiliated company name), a coupon name, a unique code (alternatively, a coupon number), a title, a benefit, a usage place, a usage period (alternatively, an expiration date), a usage method, a coupon type (for example, a free coupon or a paid coupon), a store name capable of using the corresponding coupon (alternatively, identification information of one or more (alternatively, a plurality of) wireless charging equipment which may use the corresponding coupon), and the like. That is, the first control unit 220 stores (alternatively, registers) the received coupon in a coupon/ticket menu of a my-wallet menu which is the predetermined menu of the electronic wallet app.

Further, the first control unit 220 displays the received coupon on the first display unit (not illustrated).

Further, the first control unit 220 transmits the control signal (for example, the PRU advertisement signal) to the wireless charging equipment 300 through the first communication unit 210 in order to request connection (alternatively, communication) with the corresponding wireless charging equipment 300 based on the power beacon signal transmitted from the wireless charging equipment 300, in the A4WP scheme wireless charging.

Further, the first control unit 220 establishes the connection (alternatively, communication) with the corresponding wireless charging equipment 300 based on the transmitted control signal.

Further, the first control unit 220 transmits a control signal (alternatively, a charging signal transmission request signal) (for example, including a PRU dynamic parameter) to the wireless charging equipment 300 at a predetermined time interval.

Further, the first control unit 220 controls a charging signal transmitted from the wireless charging equipment 300 to be received through the first communication unit 210 at the predetermined time interval. In this case, the first control unit 220 may also control the charging signal transmitted from the wireless charging equipment 300 to be received through the first communication unit 210 in response to the above-transmitted control signal (for example, including the PRU dynamic parameter).

Further, the first control unit 220 charges the first battery 230 based on the received charging signal. In this case, the first terminal 200 may further include an additional constituent element for charging the corresponding first battery 230 by a resonance coupling method with the wireless charging equipment 300.

As such, when the first terminal 200 exists in a BLE range of the wireless charging equipment 300, the first control unit 220 communicates with the wireless charging equipment 300. Further, the first control unit 220 charges the first battery 230 included in the first terminal 200 based on the charging signal transmitted from the wireless charging equipment 300. In this case, the first control unit 220 may receive the identification information of the wireless charging equipment 300 (alternatively, the unique information of the wireless charging equipment 300) transmitted from the wireless charging equipment 300 through the first communication unit 210 to verify the identification information of the corresponding wireless charging equipment 300 which is charging (alternatively, the unique information of the wireless charging equipment 300).

Further, the first control unit 220 receives information on one or more (alternatively, a plurality of) terminals (for example, including the second terminal 400 and the like) while being charging through the wireless charging equipment 300 through the first communication unit 210.

Further, while the first terminal 200 is wirelessly charging through the wireless charging equipment 300, the first control unit 220 executes the specific app pre-installed in the first terminal 200.

Further, the first control unit 220 selects one (alternatively, one or more/a plurality of) coupon(s) by a control (alternatively, an operation) of the user of the first terminal 200 among the plurality of coupons registered (alternatively, stored) in the executed specific app.

Further, when a predetermined button is selected (alternatively, the corresponding button is selected/clicked in a state where the coupon is selected), the first control unit 220 verifies (alternatively, determines) whether the selected coupon is usable in the store in which the corresponding wireless charging equipment 300 is provided.

That is, when the predetermined button is selected, the first control unit 220 verifies whether the received identification information of the wireless charging equipment 300 is included in the identification information of one or more (alternatively, a plurality of) predetermined wireless charging equipment which may use the corresponding coupon included in the coupon information of the selected coupon.

As the verified result (alternatively, the determined result), when the selected coupon is not the coupon usable in the store in which the corresponding wireless charging equipment 300 is provided (alternatively, when the received identification information of the wireless charging equipment 300 is not included in the identification information of one or more (alternatively, a plurality of) wireless charging equipment which may use the corresponding coupon included in the coupon information of the selected coupon), the first control unit 220 displays (alternatively, outputs) information representing that the corresponding coupon may not be shared on the first display unit (not illustrated). In this case, the first terminal 200 continuously performs the charging function with the wireless charging equipment 300.

Further, as the verified result, when the selected coupon is the coupon usable in the store in which the corresponding wireless charging equipment 300 is provided (alternatively, when the received identification information of the wireless charging equipment 300 is included in the identification information of one or more (alternatively, a plurality of) wireless charging equipment which may use the corresponding coupon included in the coupon information of the selected coupon), the first control unit 220 transmits the coupon information on the corresponding coupon, the identification information of the wireless charging equipment 300, the identification information of the first terminal 200, and the like to one or more second terminals 400 which is charging by the wireless charging equipment 300 through the first communication unit 210. In this case, the identification information of the first terminal 200 includes a mobile directory number (MDN), a mobile IP, a mobile MAC, subscriber identification module (Sim) card unique information, a serial number, and the like. Further, the identification information of the first terminal 200 may further include an international mobile subscriber identity (IMSI) of a USIM provided in the first terminal 200, a unique international mobile equipment identity (IMEI) of the first terminal 200, and the like. In this case, the first terminal 200 continuously performs the charging function with the wireless charging equipment 300. In this case, the IMSI includes a mobile country code (MCC), a mobile network code (MNC), a mobile subscriber identity (MSI), a country mobile subscriber identifier number (MSIN), and the like. Further, the IMEI includes a unique serial number of the terminal, a manufacturer of the terminal, model information, and the like.

Further, a method of transmitting the coupon information on the corresponding coupon, the identification information of the wireless charging equipment 300, the identification information of the first terminal 200, and the like to one or more second terminals 400 which is charging by the wireless charging equipment 300 may include a method of transmitting the information to one or more second terminals 400 through the wireless charging equipment 300, a method of directly transmitting the information to one or more second terminals 400 from the first terminal 200 based on the information (for example, including identification information, a telephone number, an e-mail address, messenger information, and the like) on one or more second terminals 400 provided from the wireless charging equipment 300, and the like.

That is, the first control unit 220 transmits the coupon information on the corresponding coupon, the identification information of the wireless charging equipment 300, the identification information of the first terminal 200, and the like to one or more second terminals 400 via the wireless charging equipment 300.

Further, the first control unit 220 receives information (for example, including identification information, a telephone number, an e-mail address, messenger information, and the like) on one or more second terminals 400 which is charging through the corresponding wireless charging equipment 300 transmitted from the wireless charging equipment 300 through the first communication unit 210.

Further, the first control unit 220 may transmit the coupon information on the corresponding coupon, the identification information of the wireless charging equipment 300, the identification information of the first terminal 200, and the like to one or more second terminals 400 through the dedicated app based on the received information of one or more second terminals 400.

Further, when the coupon information on the corresponding coupon, the identification information of the wireless charging equipment 300, the identification information of the first terminal 200, and the like are transmitted to the second terminals 400, the first control unit 220 may transmit the information on the corresponding second terminal 400 (for example, including the coupon information on the corresponding coupon, the identification information of the wireless charging equipment 300, the identification information of the first terminal 200, and the like) through the predetermined dedicated app and also transmit the corresponding information to the corresponding second terminal 400 in an SMS format, a push message format, an e-mail format, a QR code format, and the like.

Further, the first control unit 220 receives the coupon transfer completion information transmitted from the second terminal 400 through the first communication unit 210 in response to the corresponding information transmitted to the second terminal 400. Here, the coupon transfer completion information includes information representing that the issuance of the corresponding coupon is completed, the identification information of the second terminal 400, the identification information of the first terminal 200, the identification information of the wireless charging equipment 300, the coupon information, and the like.

Further, the first control unit 220 transmits the received coupon transfer completion information to the service providing device 100 or the wireless charging equipment 300 through the first communication unit 210.

The first battery 230 supplies the power to the corresponding first terminal 200.

Further, the first battery 230 performs the charging function based on the charging signal transmitted from the wireless charging equipment 300 by a control of the first control unit 220.

The second control unit 320 receives the coupon information on the coupon, the identification information of the wireless charging equipment 300, the identification information of the first terminal 200, and the like, which are transmitted from the first terminal 200, through the second communication unit 310.

Further, the second control unit 320 verifies one or more (alternatively, a plurality of) terminals (for example, including the first terminal 200, the second terminal 400, and the like) which is currently charging through the wireless charging equipment 300 installed (alternatively, provided) in the store and verifies the verified information (for example, including identification information, a telephone number, an e-mail address, messenger information, and the like) on one or more (alternatively, a plurality of) terminals.

Further, the second control unit 320 receives the verified information on one or more (alternatively, a plurality of) terminals to the first terminal 200 through the second communication unit 310.

Further, the second control unit 320 transmits the received coupon information on the coupon, identification information of the wireless charging equipment 300, identification information of the first terminal 200, and the like to one or more (alternatively, a plurality of) terminals corresponding to the verified information (for example, including identification information, a telephone number, an e-mail address, messenger information, and the like) on one or more (alternatively, a plurality of) terminals, respectively.

That is, the second control unit 320 transmits the coupon information on the coupon, the identification information of the wireless charging equipment 300, the identification information of the first terminal 200, and the like through the second communication unit 310 to the rest of the terminals (alternatively, one or more (alternatively, a plurality of) terminals) except for the first terminal 200 transmitting the corresponding information among one or more (alternatively, a plurality of) terminals which is charging through the corresponding wireless charging equipment 300.

Further, the second control unit 320 receives the coupon transfer completion information transmitted from the corresponding second terminal 400 through the second communication unit 310 in response to the information transmitted to the second terminal 400. Here, the coupon transfer completion information includes information representing that the issuance of the corresponding coupon is completed, the identification information of the second terminal 400, the identification information of the first terminal 200, the identification information of the wireless charging equipment 300, the coupon information, and the like.

Further, the second control unit 320 transmits the received coupon transfer completion information to the service providing device 100 through the second communication unit 310.

The second terminal 400 may include like constituent elements as the first terminal 200 (for example, including the first communication unit 210, the first control unit 220, the first battery 230, and the like).

Further, the second terminal 400 communicates with the wireless charging equipment 300. Here, the communication method between wireless charging equipment 300 and the second terminal 400 may be any one of wired/wireless communication methods. In this case, the second terminal 400 communicates with (alternatively, accesses) the wireless charging equipment 300 through the dedicated app pre-installed in the corresponding second terminal 400 and may transmit the identification information of the corresponding second terminal 400 to the wireless charging equipment 300.

Further, the second terminal 400 transmits the identification information of the second terminal 400 (alternatively, information on the second terminal 400) to the wireless charging equipment 300 while communicating. In this case, the wireless charging equipment 300 may be performing the charging function by interlocking with the first terminal 200.

Further, the second terminal 400 receives the coupon information on the coupon, the identification information of the wireless charging equipment 300, the identification information of the first terminal 200, and the like which are transmitted from the first terminal 200 or the wireless charging equipment 300. Here, the coupon information includes a coupon issuance affiliated company title (alternatively, a brand/an affiliated company name), a coupon name, a unique code (alternatively, a coupon number), a title, a benefit, a usage place, a usage period (alternatively, an expiration date), a usage method, a coupon type (for example, a free coupon or a paid coupon), a store name capable of using the corresponding coupon (alternatively, identification information of one or more (alternatively, a plurality of) wireless charging equipment which may use the corresponding coupon), and the like.

Further, the second terminal 400 determines (alternatively, verifies) whether the corresponding second terminal 400 is charging through the wireless charging equipment 300 or the identification information of the wireless charging equipment 300 while the second terminal 400 is charging coincides with the received identification information of the wireless charging equipment 300.

That is, in order to verify whether the second terminal 400 is positioned in the store which may use the received coupon information, the second terminal 400 determines whether the second terminal 400 is charging through the wireless charging equipment 300 installed in the store or the identification information of the wireless charging equipment 300 which is charging coincides with the identification information of the wireless charging equipment transmitted from the first terminal 200 (alternatively, the wireless charging equipment 300).

As the determined result (alternatively, the verified result), when the second terminal 400 is not charging through the wireless charging equipment 300 or when the identification information of the wireless charging equipment 300 while the second terminal is charging does not coincide with the received identification information of the wireless charging equipment 300, the second terminal 400 deletes (alternatively, discards) or does not store the received coupon information, the identification information of the wireless charging equipment 300, the identification information of the first terminal 200, and the like.

Further, as the determined result, when second terminal 400 is charging through the wireless charging equipment 300 or when the identification information of the wireless charging equipment 300 while the second terminal is charging coincides with the received identification information of the wireless charging equipment 300, the second terminal 400 registers (alternatively, stores) the coupon corresponding to the received coupon information in a specific app (for example, the same as the specific app installed in the first terminal 200) pre-installed in the corresponding second terminal 400. In this case, the second terminal 400 continuously performs the charging function with the wireless charging equipment 300.

Further, the second terminal 400 generates coupon transfer completion information (alternatively, coupon registering complete information) and transmits the generated coupon transfer completion information to the service providing device 100, the first terminal 200, the wireless charging equipment 300, and the like. Here, the coupon transfer completion information includes information representing that the issuance of the corresponding coupon is completed, the identification information of the second terminal 400, the identification information of the first terminal 200, the identification information of the wireless charging equipment 300, and the like.

As such, when the terminal getting the coupon provided from the service providing device is charging through the wireless charging equipment provided in the store, the coupon usable in the corresponding store may be provided to the second terminal which is charging in the wireless charging equipment.

Further, as such, the second terminal which is charging through the wireless charging equipment may register the coupon usable in the store where the corresponding wireless charging equipment is installed which is provided from the terminal which is charging through the wireless charging equipment in the dedicated app installed in the second terminal.

Figure 5:
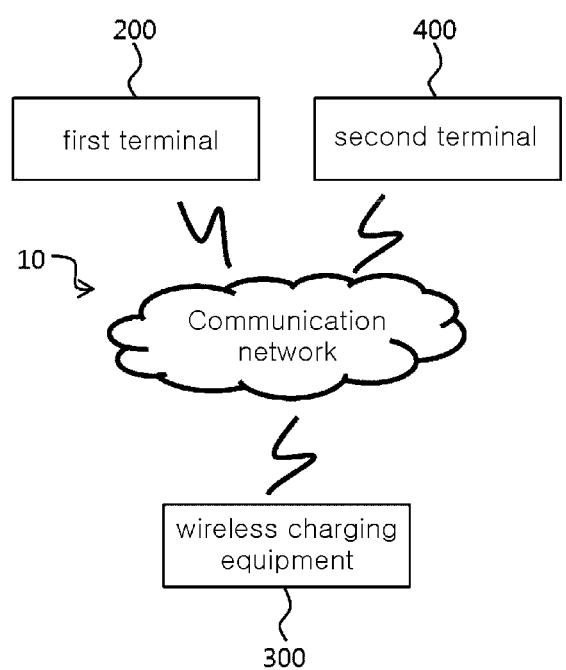
FIG. 5 is a block diagram illustrating a configuration of a wireless charging system according to another embodiment of the present invention.

FIG. 5 is a block diagram illustrating a configuration of a wireless charging system 10 according to another embodiment of the present invention.

As illustrated in FIG. 5, the wireless charging system 10 is constituted by a first terminal 200, a second terminal 400, and wireless charging equipment 300. All the constituent elements of the wireless charging system 10 illustrated in FIG. 5 are not required constituent elements, and the wireless charging system 10 may be implemented by more constituent elements than the constituent elements illustrated in FIG. 5 or less constituent elements therethan. Here, the wireless charging equipment 300, the first terminal 200, and the second terminal 400 charge a battery provided in the corresponding first terminal 200 or second terminal 200 based on a charging signal transmitted from the wireless charging equipment 300 through alliance for wireless power (A4WP) scheme (alternatively, a magnetic resonance scheme). Further, the corresponding wireless charging equipment 300, the first terminal 200, and the second terminal 400 use BLE for low power in Bluetooth.

While one or more contents to be shared by the first terminal 200 and sharing target information are being stored, when the first terminal 200 communicates with the wireless charging equipment 300, the first terminal 200 receives information on one or more (alternatively, a plurality of) terminals including the first terminal 200 which is charging through the corresponding wireless charging equipment 300 transmitted from the wireless charging equipment 300. Thereafter, when the received information on one or more terminals is included in the sharing target information, the first terminal 200 exchanges connection condition information with at least one terminal (for example, the second terminal 400) through the wireless charging equipment 300 coinciding with the sharing target information and the information on one or more terminals and finally determines a connection method between the first terminal 200 and at least one terminal. Thereafter, the first terminal 200 and at least one terminal directly communicate with each other through the same dedicated app pre-installed in each terminal based on the determined final connection condition information. Thereafter, the second terminal 400 receives one or more contents to be provided (alternatively, shared) from the first terminal 200 and stores or outputs one or more received contents.

The first control unit 220 selects one (alternatively, one or more/a plurality of) content(s) among the plurality of contents pre-stored (alternatively, registered) in a second storage unit (not illustrated). Here, the corresponding contents may be files (for example, including images, audios, videos, motion pictures, games, map information provided from a map providing program, documents, and the like) and also be a folder (alternatively, folder information) including one or more files.

Further, the first control unit 220 select sharing target information to share the selected one (alternatively, one or more/a plurality of) content(s). Here, the sharing target information includes information (for example, including identification information, a telephone number, an e-mail address, and the like) on one or more (alternatively, a plurality of) second terminals 400. That is, the first control unit 220 selects (alternatively, generates) sharing target information including one or more (alternatively, a plurality of) telephone numbers (alternatively, identification information corresponding to a corresponding telephone numbers) among the plurality telephone numbers pre-stored in the first storage unit (alternatively, according to user's selection/control of the first terminal).

Further, the first control unit 220 receives information (for example, including identification information, a telephone number, an e-mail address, messenger information, and the like) on one or more (alternatively, a plurality of) terminals which is currently charging through the corresponding wireless charging equipment 300 transmitted from the wireless charging equipment 300 through the first communication unit 210.

Further, the first control unit 220 generates a charging terminal information request signal for requesting the information on one or more (alternatively, a plurality of) terminals which is currently charging through the corresponding wireless charging equipment 300 in which the first terminal 200 is charging and transmits the generated charging terminal information request signal to the wireless charging equipment 300 through the first communication unit 210.

Further, the first control unit 220 may also receive the information on one or more (alternatively, a plurality of) terminals which is currently charging through the corresponding wireless charging equipment 300 which is transmitted from the wireless charging equipment 300 through the first communication unit 210 in response to the transmitted charging terminal information request signal.

Further, the first control unit 220 determines (alternatively, verifies) whether the received information on one or more (alternatively, a plurality of) terminals which is charging through the corresponding wireless charging equipment 300 is included in the sharing target information.

Further, as the determined result (alternatively, the verified result), when the received information on one or more (alternatively, a plurality of) terminals which is charging through the corresponding wireless charging equipment 300 is not included in the sharing target information, the first control unit 220 displays (alternatively, outputs) information representing that the terminal corresponding to the sharing target information is not included in the received information on one or more (alternatively, a plurality of) terminals which is charging through the corresponding wireless charging equipment 300 (alternatively, information representing that a sharing target terminal included in the sharing target information is not charging through the corresponding wireless charging equipment 300) on the second display unit (not illustrated) and deletes (alternatively, discards) information on one or more (alternatively, a plurality of) terminals or stores the information in the first storage unit. In this case, the wireless charging equipment 300 continuously performs the charging function with the first terminal 200.

Further, as the determined result, when the received information on one or more (alternatively, a plurality of) terminals which is charging through the corresponding wireless charging equipment 300 is included in the sharing target information, the first control unit 220 verifies a specific terminal (alternatively, at least one specific terminal) which is charging through the wireless charging equipment 300 in the sharing target information.

In the embodiment of the present invention, the corresponding specific terminal is described as the second terminal 400, but is not limited thereto, and the corresponding specific terminal may be at least one (alternatively, a plurality of) terminal(s).

Further, the first control unit 220 generates connection condition information (alternatively, access condition information/communication mode information) in order to determine the connection condition with the second terminal 400 which is the verified specific terminal. Here, the connection condition information may include any one communication mode among wireless communication modes such as Bluetooth and a WiFi mode. In this case, only when the second terminal 400 pre-permits (alternatively, admits) the content reception, a process of exchanging the connection condition information between the first terminal 200 and the second terminal 400 may be performed.

Further, the first control unit 220 exchanges the connection condition information (alternatively, the access condition information/the communication mode information) with the verified second terminal 400 via the wireless charging equipment 300 (alternatively, through the wireless charging equipment 300).

As such, the first terminal 200 and the second terminal 400 exchange the connection condition information with each other through the wireless charging equipment 300. Further, the first control unit 220 determines (alternatively, sets) final connection condition information by exchanging the corresponding connection condition information with the second terminal 400.

Further, the first control unit 220 directly communicates with (alternatively, accesses/is connected with) the second terminal 400 based on the verified final connection condition information. In this case, the first terminal 200 and the second terminal 400 may directly communicate with each other through the dedicated app pre-installed in each terminal.

Further, the first control unit 220 receives the selected one (alternatively, one or more/a plurality of) contents to the second terminal 400 through the first communication unit 210. In this case, the first control unit 220 may also transmit corresponding one (alternatively, one or more/a plurality of) content(s) to the second terminal 400 through the first communication unit 210 only when the second terminal 400 permits the content reception.

Further, when one (alternatively, one or more/a plurality of) content(s) is shared between the first control unit 220 and the second terminal 400, one (alternatively, one or more/a plurality of) content(s) selected in the first terminal 200 may synchronizes (alternatively, be shared) with the second terminal 400 by a synchronization scheme (for example, including file synchronization, folder synchronization, and the like).

Figure 6:
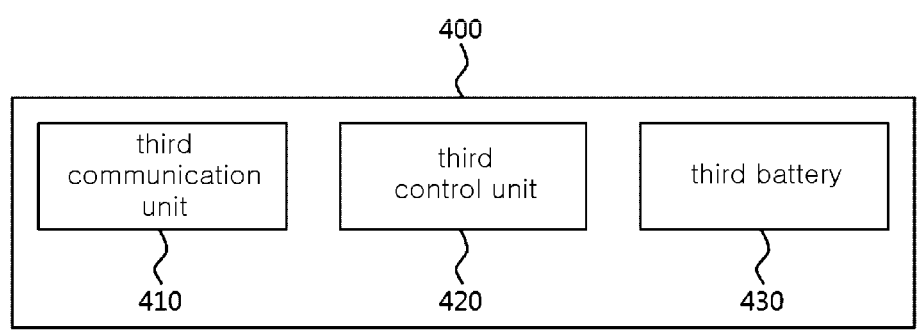
FIG. 6 is a block diagram illustrating a configuration of a second terminal according to the embodiment of the present invention.

As illustrated in FIG. 6, the second terminal 400 is constituted by a third communication unit 410, a third control unit 420, and a third battery 430. All the constituent elements of the second terminal 400 illustrated in FIG. 6 are not essential constituent elements, and the second terminal 400 may be implemented by more constituent elements than the constituent elements illustrated in FIG. 6 or less constituent elements therethan. Here, the second terminal 400 includes a PRU (not illustrated).

The third communication unit 410 communicates with other terminals by a wired/wireless communication method. Further, the third communication unit 410 communicates with the wireless charging equipment 300 using a BLE scheme by using BLE.

Further, the third communication unit 410 receives a power beacon signal transmitted from the wireless charging equipment 300.

The third control unit 420 executes an overall control function of the second terminal 400.

Further, a charging function between the third control unit 420 and the wireless charging equipment 300 is the same as the charging function between the first control unit 220 and the wireless charging equipment 300 which are included in the first terminal 200 described above, and the description thereof will be omitted.

Further, the third control unit 420 transmits identification information of the second terminal 400 to the wireless charging equipment 300 which is charging through the third communication unit 410.

Further, when the corresponding second terminal 400 is included in the sharing target information to share the contents in the first terminal 200 among one or more (alternatively, a plurality of) terminals which is charging through the wireless charging equipment 300 including the second terminal 400, the third control unit 420 receives the connection condition information (alternatively, the access condition information/the communication mode information) transmitted from the first terminal 200 via the wireless charging equipment 300 through the third communication unit 410. Here, the connection condition information may include any one communication mode among wireless communication modes such as Bluetooth and a WiFi mode. In this case, only when the second terminal 400 pre-permits (alternatively, admits) the content reception, a process of exchanging the connection condition information between the first terminal 200 and the second terminal 400 may be performed.

Further, the third control unit 420 generates response information (for example, including acceptance of the connection condition, generation of another connection condition information, and the like) representing whether to accept the received connection condition information.

Further, the third control unit 420 transmits the generated response information to the first terminal 200 via the wireless charging equipment 300 in response to the received connection condition information.

As such, the first terminal 200 and the second terminal 400 exchange the connection condition information with each other via the wireless charging equipment 300 and determine the final connection condition information.

Further, the third control unit 420 directly communicates with (alternatively, accesses/is connected with) the first terminal 200 based on the determined final connection condition information. In this case, the first terminal 200 and the second terminal 400 may directly communicate with each other through the dedicated app pre-installed in each terminal.

Further, the third control unit 420 receives one (alternatively, one or more/a plurality of) sharing content(s) transmitted from the first terminal 200 through the third communication unit 410. In this case, the third control unit 420 may receive the corresponding one (alternatively, one or more/a plurality of) content(s) transmitted from the first terminal 200 only when the second terminal 400 pre-permits the content reception. Here, when the first terminal 200 and the second terminal 400 directly communicate with each other, the direct communication between the first terminal 200 and the second terminal 400 may be continuously performed regardless of a case where the first terminal 200 or the second terminal 400 is charging through the wireless charging equipment 300, the charging stops, or the charging is completed.

Further, when the second terminal 400 does not pre-permit the content reception, the third control unit 420 immediately discards (alternatively, deletes) or does not store the corresponding one (alternatively, one or more/a plurality of) content(s) transmitted from the first terminal 200.

Further, the third control unit 420 stores the received one (alternatively, one or more/a plurality of) content(s) in a third storage unit (not illustrated). Further, the third control unit 420 displays the received one (alternatively, one or more/a plurality of) content(s) on a third display unit (not illustrated) through a dedicated app.

Further, the third control unit 420 generates sharing state information. Here, the sharing state information includes information on the contents shared between terminals, identification information of the first terminal 200 and the second terminal 400 sharing the contents with each other, identification information of the wireless charging equipment 300, a sharing time, and the like. Further, the third control unit 420 transmits the generated sharing state information to the wireless charging equipment 300 or the service providing device (not illustrated) through the third communication unit 410.

In this case, the corresponding service providing device stores the sharing state information as big data for providing an additional service. Further, when the first terminal 200 or the second terminal 400 visits a predetermined store (alternatively, visits the store where the corresponding wireless charging equipment 300 is installed), the sharing state information stored in the service providing device may be used as big data for providing the additional service from the service providing device.

Further, the service providing device generates additional service information for each terminal based on the sharing state information.

Further, the service providing device transmits the generated additional service information to the corresponding first terminal 200 or second terminal 400 through the wireless charging equipment 300. Here, the additional service information includes various contents curation such as promotion information for each store provided with the wireless charging equipment 300, coupon information, marketing information, review information for each product, news information, and music information.

Further, when a purchase function (alternatively, a payment function) for a specific product included in the additional service information transmitted to the first terminal 200 or the second terminal 400 is requested, the service providing device may also perform the purchase function for the corresponding product by interlocking among the wireless charging equipment 300, the first terminal 200 (alternatively, the second terminal 400), and the POS terminal (not illustrated).

The third battery 430 supplies the power to the corresponding second terminal 400.

Further, the third battery 430 performs a charging function based on the charging signal transmitted from the wireless charging equipment 300 by a control of the third control unit 420.

The second control unit 320 verifies one or more (alternatively, a plurality of) terminals which is charging through the wireless charging equipment 300 in real time.

Further, the second control unit 320 verifies information (for example, including identification information, a telephone number, an e-mail address, and the like) on one or more (alternatively, a plurality of) terminals which is charging through the wireless charging equipment 300, which are verified in real time.

Further, the second control unit 320 transmits the verified information on one or more (alternatively, a plurality of) terminals to one or more (alternatively, a plurality of) terminals which is charging through the second communication unit 310, respectively. In this case, the second control unit 320 may transmit the corresponding information on one or more (alternatively, a plurality of) terminals to one or more (alternatively, a plurality of) terminals which is charging through the second communication unit 310 in an empty time period (alternatively, a standby time period) in which the charging signal is not transmitted to one or more (alternatively, a plurality of) terminals, respectively.

Further, the second control unit 320 may also transmit the corresponding information to only the specific terminal requesting the information on one or more (alternatively, a plurality of) terminals which is currently charging.

That is, the second control unit 320 receives the charging terminal information request signal for requesting the information on one or more (alternatively, a plurality of) terminals which is currently charging which is transmitted from the first terminal 200, through the second communication unit 310.

Further, the second control unit 320 transmits the information on one or more (alternatively, a plurality of) terminals which is currently charging through the wireless charging equipment 300 to the first terminal 200 through the second communication unit 310 in response to the received charging terminal information request signal.

Further, when the second terminal 400 as the target terminal to share the contents to be shared in the first terminal 200 is currently charging through the wireless charging equipment 300, the second control unit 320 receives the connection condition information (alternatively, the access condition information/the communication mode information) transmitted from the first terminal 200 through the second communication unit 310. Here, the connection condition information may include any one communication mode among wireless communication modes such as Bluetooth and a WiFi mode.

Further, the second control unit 320 transmits the received connection condition information (alternatively, the access condition information/the communication mode information) to the corresponding second terminal 400 through the second communication unit 310.

As such, the first terminal 200 and the second terminal 400 exchange the connection condition information with each other via the wireless charging equipment 300.

Further, in the embodiment of the present invention, verifying the specific terminal (for example, including the second terminal 400 and the like) which coincides with the sharing target information and the information on the terminal which is charging through the wireless charging equipment 300 and performing the direct communication function with the verified specific terminal in the first terminal 200 are described, but are not limited thereto. The wireless charging equipment 300 may be configured to receive (alternatively, acquire) the sharing target information from the first terminal 200 and verify the specific terminal which coincides with the received sharing target information and the information on the terminal which is charging through the wireless charging equipment 300. Further, the wireless charging equipment 300 transmits the verified information on the specific terminal to the first terminal 200. Thereafter, the first terminal 200 may also perform a direct communication function with the corresponding specific terminal based on the information on the specific terminal provided from the wireless charging equipment 300.

As such, data may be shared among the plurality of terminals which is charging through the wireless charging equipment.

Further, as such, a method of directly exchanging mass data among the plurality of terminals which is charging through the wireless charging equipment may be provided.

Hereinafter, a control method of a wireless charging system according to the present invention will be described in detail with reference to FIGS. 1 to 9.

Figure 7:
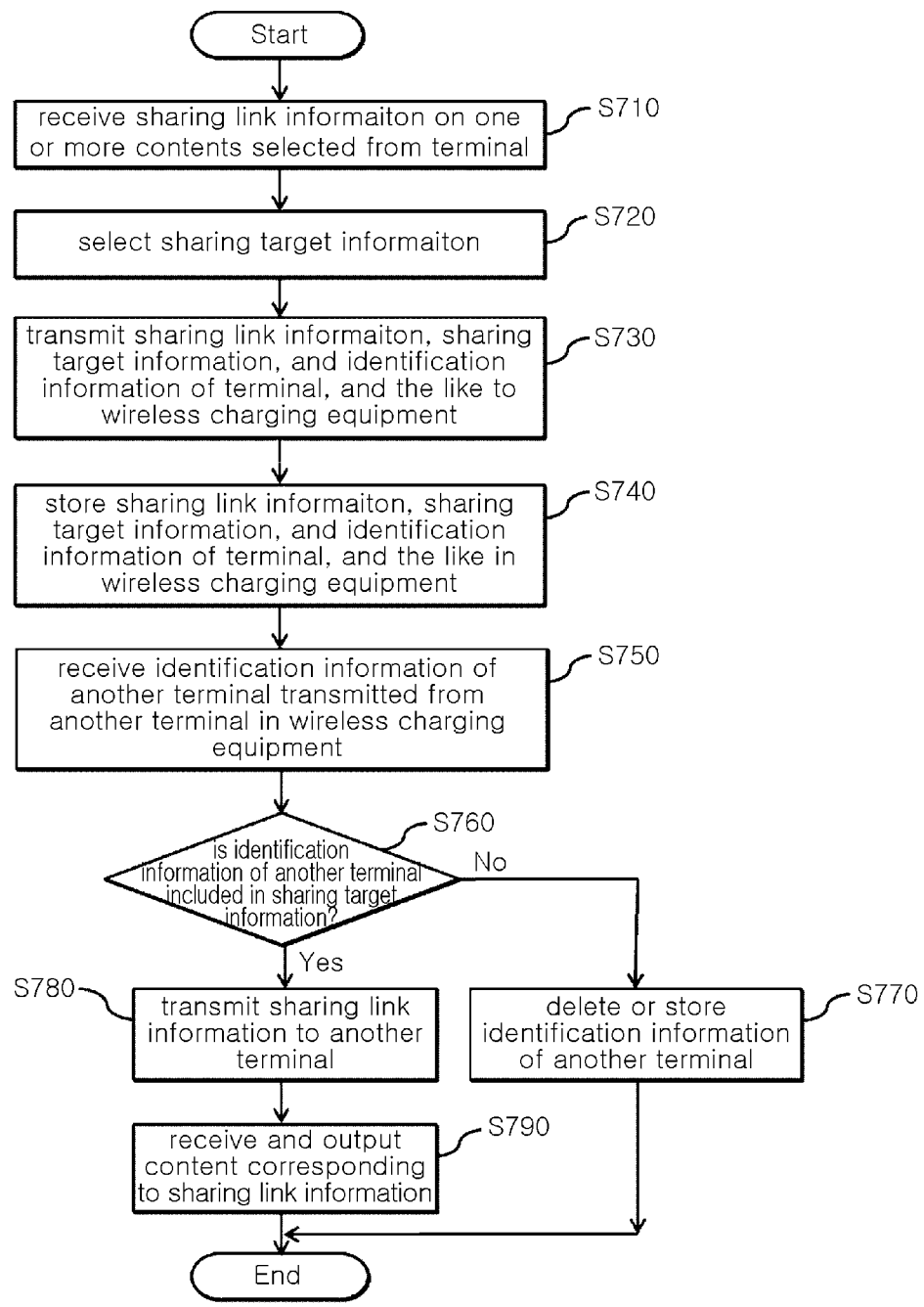
FIG. 7 is a flowchart illustrating a control method of the wireless charging system according to a first embodiment of the present invention.

FIG. 7 is a flowchart illustrating a control method of a wireless charging system according to a first embodiment of the present invention.

First, the first terminal 200 selects one (alternatively, one or more/a plurality of) content(s) among the plurality of contents pre-stored in the service providing device 100 while communicating. Here, the corresponding contents may be files (for example, including images, audios, videos, motion pictures, games, map information provided from a map providing program, documents, and the like) and also be a folder (alternatively, folder information) including one or more files.

Further, the first terminal 200 receives sharing link information on the corresponding selected contents provided (alternatively, transmitted) from the service providing device 100 and stores the received sharing link information. Here, the sharing link information includes address information in which the corresponding contents are stored in the corresponding service providing device 100, and the like.

As an example, the first terminal 200 selects an ○○ image among the plurality of contents pre-stored in the service providing device 100 while communicating and receives the sharing link information corresponding to the address information in which the ○○ image selected from the corresponding service providing device 100 provided from the service providing device 100 is stored (S710).

Thereafter, the first terminal 200 selects sharing target information to share the corresponding sharing link information. Here, the sharing target information includes information (for example, including identification information, a telephone number, an e-mail address, and the like) on one or more (alternatively, a plurality of) second terminals 400.

That is, the first terminal 200 selects sharing target information to share the corresponding sharing link information in information (for example, including identification information, a telephone number, an e-mail address, and the like) on the plurality of second terminals 400 prestored in the first terminal 200.

As an example, the first terminal 200 selects the sharing target information including telephone numbers of the first terminal, the second terminal, and the third terminal from the information on the plurality of pre-stored second terminals 400 (S720).

Thereafter, when the first terminal 200 exists in a BLE range of the wireless charging equipment 300, the first terminal 200 communicates with the wireless charging equipment 300. Further, the first terminal 220 charges the first battery 230 included in the first terminal 200 based on the charging signal transmitted from the wireless charging equipment 300.

Further, the first terminal 200 transmits the sharing link information, the sharing target information, the identification information of the first terminal 200, and the like to the wireless charging equipment 300 while communicating. In this case, the first terminal 200 may transmit the corresponding sharing link information, the sharing target information, the identification information of the first terminal 200, and the like to the wireless charging equipment 300 in an empty time period (alternatively, a standby time period) in which the charging signal is not transmitted to and received from the wireless charging equipment 300. Here, the identification information of the first terminal 200 includes an MDN, a mobile IP, a mobile MAC, Sim card unique information, a serial number, and the like.

As an example, when the first terminal 200 exists in a BLE range of the wireless charging equipment 300, the communication function between the first terminal 200 and the wireless charging equipment 300 is performed. Thereafter, the first terminal 200 transmits the sharing link information (for example, the sharing link information corresponding to the address information in which the ○○ image is stored), the sharing target information (for example, the sharing target information including the telephone numbers of the first terminal, the second terminal, and the third terminal), the identification information of the first terminal 200, and the like to the wireless charging equipment 300 (S730).

Thereafter, the wireless charging equipment 300 receives the sharing link information, the sharing target information, the identification information of the first terminal 200, and the like, which are transmitted from the first terminal 200.

Further, the wireless charging equipment 300 stores the received sharing link information, sharing target information, identification information of the first terminal 200, and the like.

As an example, the wireless charging equipment 300 stores the sharing link information (for example, the sharing link information corresponding to the address information in which the ○○ image is stored), the sharing target information (for example, the sharing target information including the telephone numbers of the first terminal, the second terminal, and the third terminal), the identification information of the first terminal 200, and the like, which are transmitted from the first terminal 200 (S740).

Thereafter, while the corresponding first terminal 200 is charging by interlocking between the first terminal 200 and the wireless charging equipment 300, the wireless charging equipment 300 receives the identification information of the second terminal 400 (alternatively, the information on the second terminal 400) transmitted from the second terminal 400. Here, the communication method between wireless charging equipment 300 and the second terminal 400 may be any one of wired/wireless communication methods. In this case, the second terminal 400 communicates with (alternatively, accesses) the wireless charging equipment 300 through the dedicated app pre-installed in the corresponding second terminal 400 and may transmit the identification information of the corresponding second terminal 400 to the wireless charging equipment 300.

As an example, while transmitting the charging signal to the first terminal 200 connected to the corresponding wireless charging equipment 300 (alternatively, positioned in the BLE radius of the corresponding wireless charging equipment 300) at a predetermined time interval (for example, 250 ms) in the wireless charging equipment 300, the wireless charging equipment 300 communicates with the second terminal 400 through a specific app pre-installed (alternatively, set) in the second terminal 400 and receives the identification information of the second terminal 400 (alternatively, a telephone number of the second terminal 400) transmitted from the corresponding second terminal 400 (S750).

Thereafter, the wireless charging equipment 300 determines (alternatively, verifies) whether the identification information of the second terminal 400 is included in the pre-stored sharing target information.

As an example, the wireless charging equipment 300 determines whether the received identification information of the second terminal 400 (alternatively, the telephone number of the second terminal 400) is included in the stored sharing target information (for example, the sharing target information including the telephone numbers of the first terminal, the second terminal, and the third terminal) (S760).

As the determined result, when the identification information of the second terminal 400 is not included in the pre-stored sharing target information, the wireless charging equipment 300 deletes (alternatively, discards) or stores the identification information of the corresponding second terminal 400. In this case, the wireless charging equipment 300 continuously performs the charging function with the first terminal 200.

As an example, when the received identification information of the second terminal 400 (alternatively, the telephone number of the second terminal 400) is not included in the stored sharing target information (for example, the sharing target information including the telephone numbers of the first terminal, the second terminal, and the third terminal), the wireless charging equipment 300 continuously performs the charging function with the first terminal 200 and deletes the identification information of the corresponding second terminal 400 (S770).

Further, as the determined result, when the identification information of the second terminal 400 is included in the pre-stored sharing target information, the wireless charging equipment 300 transmits the stored sharing link information to the second terminal 400. In this case, the wireless charging equipment 300 continuously performs the charging function with the first terminal 200.

As an example, when the received identification information of the second terminal 400 (alternatively, the telephone number of the second terminal 400) is included in the stored sharing target information (for example, the sharing target information including the telephone numbers of the first terminal, the second terminal, and the third terminal), the wireless charging equipment 300 continuously performs the charging function with the first terminal 200 and transmits the stored sharing link information (for example, the sharing link information corresponding to the address information in which the ∘∘ image is stored) to the second terminal 400 (S780).

Thereafter, the second terminal 400 receives the sharing link information transmitted from the wireless charging equipment 300 in response to the received identification information of the second terminal 400 (alternatively, the information on the second terminal 400). Further, the second terminal 400 stores the received sharing link information.

Further, the second terminal 400 communicates with the service providing device 100 related with the corresponding sharing link information based on the received sharing link information.

Further, the second terminal 400 requests the transmission of the contents corresponding to the corresponding sharing link information to the service providing device 100 based on the corresponding sharing link information.

Further, the second terminal 400 receives the contents corresponding to the corresponding sharing link information transmitted from the service providing device 100 in response to the request and outputs or stores the received contents.

In this case, the corresponding service providing device 100 stores sharing state information as big data for providing an additional service. Here, the corresponding sharing state information includes identification information of the first terminal 200 related with the sharing state information, identification information of the second terminal 400, sharing link information (alternatively, sharing target), a sharing time, and the like. Further, when the first terminal 200 or the second terminal 400 visits a predetermined store, the sharing state information stored in the service providing device 100 may be used as big data for providing the additional service from the service providing device 100.

As an example, the second terminal 400 receives the sharing link information (for example, the sharing link information corresponding to the address information in which the ∘∘ image is stored) transmitted from the wireless charging equipment 300 accessed through the pre-installed (alternatively, set) specific app. Further, the second terminal 400 accesses the service providing device 100 corresponding to the received sharing link information (for example, the sharing link information corresponding to the address information in which the ∘∘ image is stored). Further, the second terminal 400 requests the transmission of the ∘∘ image corresponding to the corresponding sharing link information based on the sharing link information. Further, the second terminal 400 receives the ∘∘ image corresponding to the corresponding sharing link information transmitted (alternatively, provided) from the service providing device 100 in response to the corresponding request and stores or displays the received ∘∘ image (S790).

Figure 8:
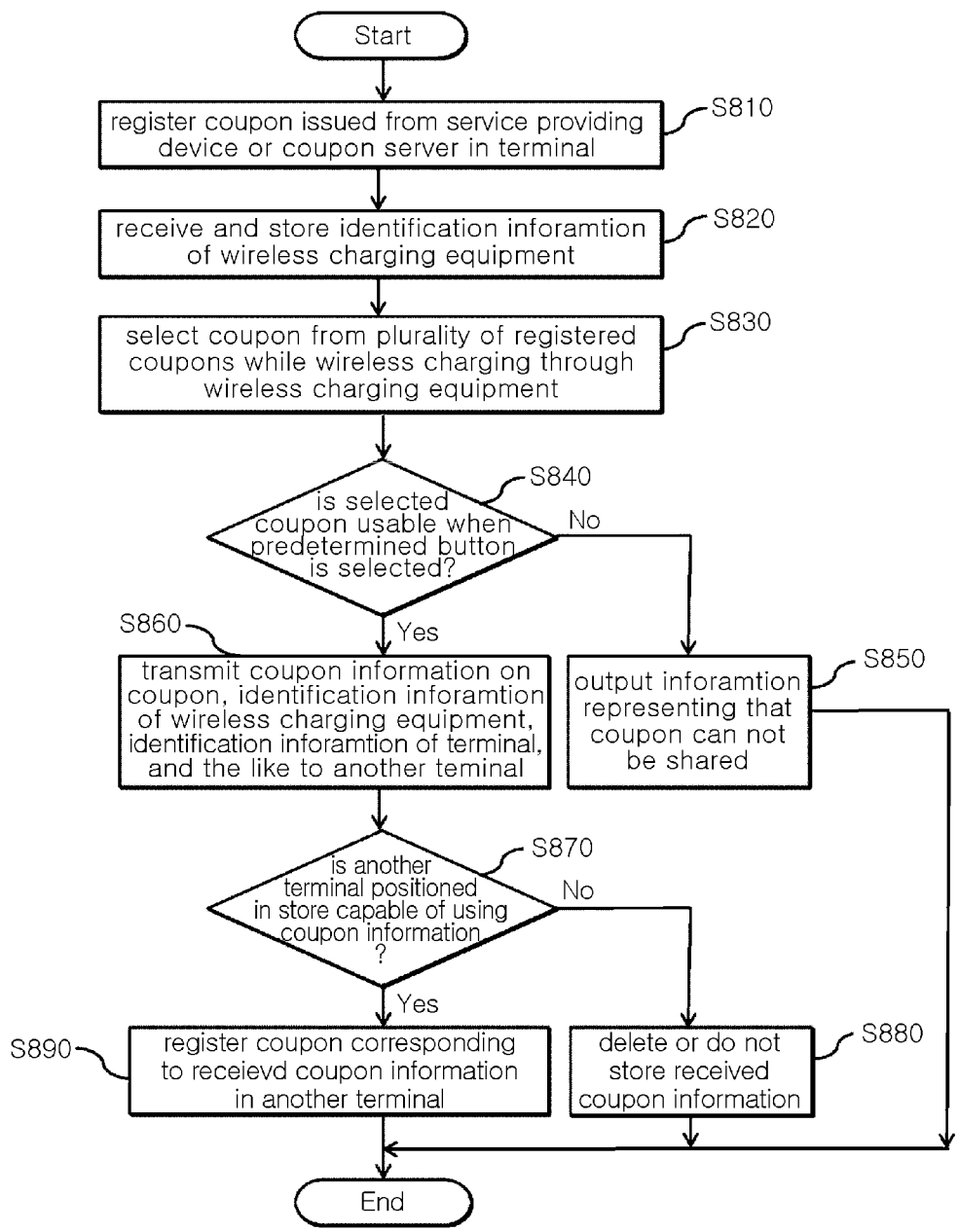
FIG. 8 is a flowchart illustrating a control method of the wireless charging system according to a second embodiment of the present invention.

FIG. 8 is a flowchart illustrating a control method of a wireless charging system according to a second embodiment of the present invention.

First, the first terminal 200 registers (alternatively, stores) a coupon issued from the service providing device 100 or a coupon server (not illustrated). In this case, the first terminal 200 may register (alternatively, store/interlock) the corresponding coupon in a dedicated app preinstalled in the first terminal 200. Here, the corresponding coupon may be generated based on coupon information including an affiliated company title (alternatively, a brand/affiliated company name) issuing a coupon, a coupon name, a unique code (alternatively, a coupon number), a title, a benefit, a usage place, a usage period (alternatively, an expiration date), a usage method, a coupon type (for example, a free coupon or a paid coupon), a store title (alternatively, identification information of one or more (alternatively, a plurality of) wireless charging equipment capable of using the coupling) capable of using the corresponding coupon, and the like.

Further, the first terminal 200 may register the coupon issued from the service providing device 100 or the coupon server (not illustrated) through an SMS format, a push message format, an e-mail format, QR code recognition, and the like.

As an example, the first terminal 200 registers a free coupon for a cup of Americano of a ∘∘ brand, which is issued from the service providing device 100 in a ΔΔ app installed in the first terminal 200. Here, the corresponding free coupon may include identification information of first to 100-th wireless charging equipment (S810).

Thereafter, when the first terminal 200 exists in a BLE range of the wireless charging equipment 300, the first terminal 200 communicates with the wireless charging equipment 300. Further, the first terminal 200 charges the battery 230 included in the first terminal 200 based on the charging signal transmitted from the wireless charging equipment 300. In this case, the first terminal may verify the identification information (alternatively, unique information of the wireless charging equipment 300) of the wireless charging equipment 300.

As an example, when the first terminal 200 exists in the BLE range of first wireless charging equipment, the first terminal 200 communicates with the first wireless charging equipment. Further, the first terminal 200 receives identification information of the first wireless charging equipment transmitted from the first wireless charging equipment (S820).

Thereafter, while the first terminal 200 is wirelessly charged through the wireless charging equipment 300, the first terminal 200 executes a specific app preinstalled in the first terminal 200 and selects one (alternatively, one or more/a plurality of) coupon(s) among a plurality of coupons registered (alternatively, stored) the specific executed app.

As an example, while the first terminal 200 is wirelessly charged by interlocking with the wireless charging equipment 300, the first terminal 200 executes the specific app and selects the free coupon for a cup of Americano of the ∘∘ brand among the plurality of coupons registered in the specific executed app (S830).

Thereafter, when a predetermined button is selected (alternatively, when the corresponding button is selected/clicked while the coupon is selected), the first terminal 200 verifies (alternatively, determines) whether the selected coupon is a coupon usable in a store with the wireless charging equipment 300.

That is, when the predetermined button is selected, the first terminal 200 verifies whether the received identification information of the wireless charging equipment 300 is included in the identification information of one or more (alternatively, the plurality of) wireless charging equipment capable of using the corresponding coupon, which is included in coupon information on the selected coupon.

As an example, when a predetermined use button is selected, the first terminal 200 verifies whether the received identification information of the first wireless charging equipment is included in the identification information of the plurality of wireless charging equipment capable of using the corresponding free coupon for a cup of Americano, which is included in the coupon information on the free coupon for a cup of Americano of the ∘∘ brand (S840).

According to a result of the verification (alternatively, a result of the determination), when the selected coupon is not the coupon usable in the store with the wireless charging equipment 300 (alternatively, when the received identification information of the wireless charging equipment 300 is not included in the identification information of one or more (alternatively, the plurality of) wireless charging equipment capable of using the corresponding coupon included in the coupon information on the selected coupon), the first terminal 200 outputs information indicating whether the corresponding coupon may not be shared. In this case, the first terminal 200 continuously performs a charging function with the wireless charging equipment 300.

As an example, when the identification information of the first wireless charging equipment is not included in the identification information of the plurality of wireless charging equipment capable of using the free coupon for a cup of Americano, which is included in the coupon information on the free coupon for a cup of Americano of the ∘∘ brand, the first terminal 200 outputs the information indicating that the free coupon for a cup of Americano of the ∘∘ brand may not be shared (S850).

Further, according to a result of the verification, when the selected coupon is the coupon usable in the store with the corresponding wireless charging equipment 300 (alternatively, the received identification information of the wireless charging equipment 300 is included in the identification information of one or more (alternatively, the plurality of) wireless charging equipment capable of using the corresponding coupon included in the coupon information on the selected coupon), the first terminal 200 transmits the coupon information on the coupon, the identification information of the wireless charging equipment 300, the identification information of the first terminal 200, and the like to one or more second terminals 400 which are charging through the wireless charging equipment 300. In this case, the first terminal 200 continuously performs the charging function with the wireless charging equipment 300.

Here, the first terminal 200 may transmit the coupon information on the corresponding coupon, the identification information of the wireless charging equipment 300, the identification information of the first terminal 200, and the like to one or more second terminals 400 via the wireless charging equipment 300.

Further, the first terminal 200 receives information (for example, identification information, a phone number, an e-mail address, messenger information, and the like) on one or more second terminal 400 which is charged through the corresponding wireless charging equipment 300, which is transmitted from the wireless charging equipment 300. Thereafter, the first terminal 200 may transmit the coupon information on the coupon, the identification information of the wireless charging equipment 300, the identification information of the first terminal 200, and the like to one or more second terminals 400 through a dedicated app based on the received information on one or more second terminals 400.

As an example, when the identification information of the first wireless charging equipment is included in the identification information of the plurality of wireless charging equipment capable of using the free coupon for a cup of Americano, which is included in the coupon information on the free coupon for a cup of Americano of the ∘∘ brand, the first terminal 200 transmits the coupon information on the free coupon for a cup of Americano, the identification information of the first wireless charging equipment, the identification information of the first terminal 200, and the like to the first wireless charging equipment. Thereafter, the first wireless charging equipment receives the coupon information on the free coupon for a cup of Americano, the identification information of the first wireless charging equipment, the identification information of the first terminal 200, and the like, which are transmitted from the first terminal 200. Further, the first wireless charging equipment verifies one or more second terminals 400 which are currently charged through the corresponding first wireless charging equipment. Thereafter, the wireless charging equipment 300 transmits the coupon information on the free coupon for a cup of Americano, the identification information of the first wireless charging equipment, the identification information of the first terminal 200, and the like, to one or more second terminals 200 which are verified.

As another example, when the identification information of the first wireless charging equipment is included in the identification information of the plurality of wireless charging equipment capable of using the free coupon for a cup of Americano, which is included in the coupon information on the free coupon for a cup of Americano of the ∘∘ brand, the first terminal 200 receives the information (for example, the identification information, the phone number, the e-mail address, the messenger information, and the like) on one or more second terminals 400 which are charged through the first charging equipment, which is transmitted from the first wireless charging equipment. Thereafter, the first terminal 200 transmits the coupon information on the free coupon for a cup of Americano, the identification information of the first wireless charging equipment, the identification information of the first terminal 200, and the like to one or more second terminals in a text message format based on the received information on one or more second terminals 400 (S860).

Thereafter, each of one or more second terminals 200 receives the coupon information on the coupon, which is transmitted from the first terminal 200 or the wireless charging equipment 300, the identification information of the wireless charging equipment 300, the identification information of the first terminal 200, and the like.

Further, the second terminal 400 determines (alternatively, verifies) whether the second terminal 400 is charged through the wireless charging equipment 300 or the identification information of the wireless charging equipment 300 in which the second terminal 400 matches the received identification information of the wireless charging equipment 300.

That is, in order to verify whether the second terminal 400 is positioned at the store capable of using the received coupon information (alternatively, the coupon corresponding to the corresponding coupon information), the second terminal 400 determines whether the second terminal 400 is charged through the wireless charging equipment 300 installed at the store or the identification information of the wireless charging equipment 300 that performing charging matches the identification information of the wireless charging equipment, which is transmitted from the first terminal 200 (alternatively, the wireless charging equipment 300).

As an example, the second terminal 400 receives the coupon information on the free coupon for a cup of Americano, the identification information of the first wireless charging equipment, the identification information of the first terminal 200, and the like, which are transmitted from the first terminal 200. Further, the second terminal 400 verifies identification information of second wireless charging equipment which currently performs charging. Thereafter, the second terminal 400 determines whether the identification information of the second wireless charging equipment which performs charging matches (is the same as) the identification information of the first wireless charging equipment, which is transmitted from the first terminal 200 (S870).

According to a result of the determination (alternatively, according to a result of the verification), when the second terminal 400 is not charged through the wireless charging equipment 300 or when the identification information of the wireless charging equipment 300 in which the second terminal 400 is charged does not match the received identification information of the wireless charging equipment 300, the second terminal 400 deletes (alternatively, discards) or does not store the received coupon information.

As an example, when the identification information of the second wireless charging equipment that performs charging is not the same as the identification information of the first wireless charging equipment transmitted from the first terminal 200, the second terminal 400 deletes the coupon information on the free coupon for a cup of Americano, which is transmitted from the first terminal 200 (S880).

Further, according to the result of the determination, when the second terminal 400 is charged through the wireless charging equipment 300 or when the identification information of the wireless charging equipment 300 in which the second terminal 400 is charged matches the received identification information of the wireless charging equipment 300, the second terminal 400 registers (alternatively, stores) the coupon corresponding to the received coupon information in a specific app (for example, the same as the specific app installed in the first terminal 200) preinstalled in the corresponding second terminal 400. In this case, the second terminal 400 continuously performs the charging function with the wireless charging equipment 300.

Further, the second terminal 400 generates coupon transfer completion information (alternatively, coupon registration completion information) and transmits the generated coupon transfer completion information to the service providing device 100, the first terminal 200, the wireless charging equipment 300, and the like. Here, the coupon transfer completion information includes information indicating that issuing the coupon is completed, the identification information of the second terminal 400, the identification information of the first terminal 200, the identification information of the wireless charging equipment 300, the coupon information, and the like.

As an example, when the identification information of the second wireless charging equipment that performs charging is the same as the identification information of the first wireless charging equipment transmitted from the first terminal 200, the second terminal 400 registers the free coupon for a cup of Americano, which corresponds to the coupon information for the free coupon of a cup of Americano, which is transmitted from the dedicated app, in a ΔΔ app installed in the corresponding second terminal. Further, the second terminal 400 generates coupon transfer completion information including information indicating that issuing the free coupon for a cup of Americano, the identification information of the second terminal 400, the identification information of the first terminal 200, the identification information of the first wireless charging equipment, the coupon information, and the like and transmits the generated coupon transfer completion information to the service providing device 100, the first terminal 200, the first wireless charging equipment, and the like.

As another example, when the identification information of the second wireless charging equipment that performs charging is the same as the identification information of the first wireless charging equipment transmitted from the first terminal 200, the second terminal 400 registers the free coupon for a cup of Americano, which corresponds to the coupon information for the free coupon of a cup of Americano, which is received in the text message format, in a ΔΔ app installed in the second terminal. Further, the second terminal 400 generates coupon transfer completion information including information indicating that issuing the free coupon for a cup of Americano, the identification information of the second terminal 400, the identification information of the first terminal 200, the identification information of the first wireless charging equipment, the coupon information, and the like and transmits the generated coupon transfer completion information to the service providing device 100, the first terminal 200, the first wireless charging equipment, and the like (S890).

Figure 9:
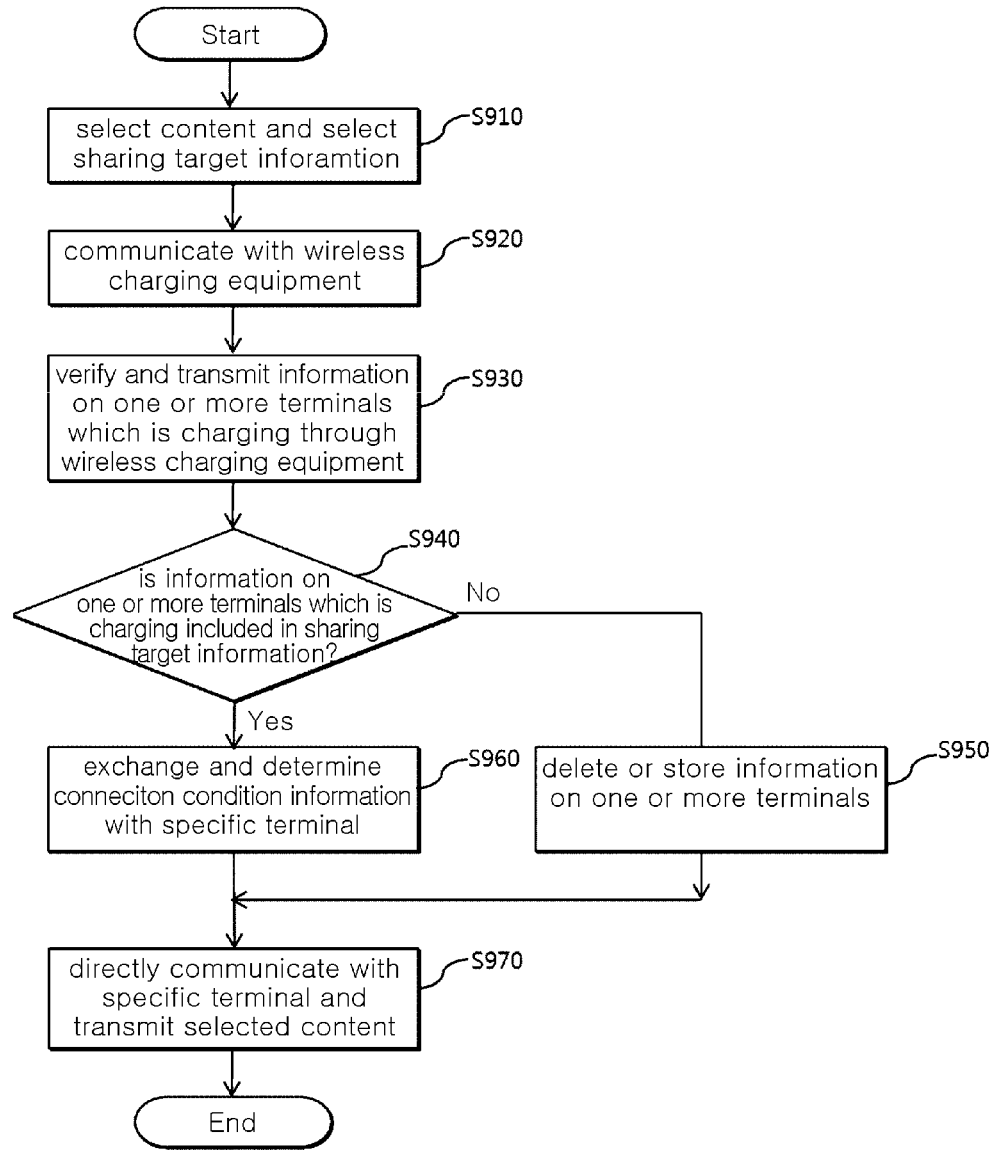
FIG. 9 is a flowchart illustrating a control method of the wireless charging system according to a third embodiment of the present invention.

FIG. 9 is a flowchart illustrating a control method of a wireless charging system according to a third embodiment of the present invention.

First, the first terminal 200 selects one (alternatively, one or more/a plurality of) content(s) among the plurality of contents pre-stored (alternatively, registered) in the first terminal 200. Here, the corresponding contents may be files (for example, including images, audios, videos, motion pictures, games, map information provided from a map providing program, documents, and the like) and also be a folder (alternatively, folder information) including one or more files.

Further, the first terminal 200 selects sharing target information to share the selected content. Here, the sharing target information includes information (for example, including identification information, a telephone number, an e-mail address, and the like) on one or more (alternatively, a plurality of) other terminals 400.

That is, the first terminal 200 selects sharing target information including one or more (alternatively, a plurality of) telephone numbers (alternatively, identification information corresponding to a corresponding telephone numbers) among the plurality telephone numbers pre-stored (alternatively, registered) in the first terminal 200.

As an example, the first terminal 200 selects a ∘∘ image among the plurality of contents prestored in the first terminal 200.

Further, the first terminal 200 selects sharing target information including telephone numbers of a second terminal, a third terminal, and a fourth terminal among telephone numbers for the plurality of pre-stored other terminals 400 (S910).

Thereafter, when the first terminal 200 exists in a BLE range of the wireless charging equipment 300, the first terminal 200 communicates with the wireless charging equipment 300. Further, the first terminal 200 charges the first battery 230 included in the first terminal 200 based on the charging signal transmitted from the wireless charging equipment 300. In this case, the first terminal 200 transmits the identification information of the corresponding first terminal 200 to the wireless charging equipment 300. Here, the identification information of the first terminal 200 includes an MDN, a mobile IP, a mobile MAC, Sim card unique information, a serial number, and the like.

As an example, when the first terminal 200 exists in a BLE range of the wireless charging equipment 300, the communication function between the first terminal 200 and the wireless charging equipment 300 is performed. Further, the first terminal 200 transmits the identification information of the corresponding first terminal 200 to the wireless charging equipment 300 (S920).

Thereafter, the wireless charging equipment 300 verifies one or more (alternatively, a plurality of) terminals including the first terminal 200 which is currently charging through the corresponding wireless charging equipment 300 and verifies information (for example, including identification information, a telephone number, an e-mail address, and the like) on the verified one or more (alternatively, a plurality of) terminals.

Further, the wireless charging equipment 300 transmits the verified information on one or more (alternatively, a plurality of) terminals to one or more (alternatively, a plurality of) terminals which is charging, respectively. In this case, the wireless charging equipment 300 may transmit the corresponding information on one or more (alternatively, a plurality of) terminals to one or more (alternatively, a plurality of) terminals which is charging in an empty time period (alternatively, a standby time period) in which the charging signal is not transmitted to one or more (alternatively, a plurality of) terminals, respectively.

As an example, while the charging signals are transmitted to the plurality of terminals including the first terminal 200 connected to the corresponding wireless charging equipment 300 (alternatively, positioned in the BLE radius of the corresponding wireless charging equipment 300) at a predetermined time interval (for example, 250 ms) in the wireless charging equipment 300, respectively, the wireless charging equipment 300 verifies the plurality of terminals including the first terminal 200 which is currently charging and verifies the verified telephone numbers of the plurality of terminals (alternatively, identification information corresponding to the corresponding telephone numbers), respectively. Thereafter, the wireless charging equipment 300 transmits the verified telephone numbers of the plurality of terminals to the corresponding plurality of terminals, respectively.

Further, in the embodiment of the present invention, transmitting the information on one or more (alternatively, a plurality of) terminals which is charging in the empty time period in the wireless charging equipment 300 to each terminals is described, but is not limited thereto. The wireless charging equipment 300 may transmit the information on one or more (alternatively, a plurality of) terminals which is charging only in a specific terminal (for example, the first terminal 200) requesting the information on the terminals which is currently charging through the corresponding wireless charging equipment 300.

Thereafter, the first terminal 200 which is charging through the wireless charging equipment 300 receives the information on one or more (alternatively, a plurality of) terminals which is charging through the wireless charging equipment 300 transmitted from the wireless charging equipment 300.

Further, the first terminal 200 determines (alternatively, verifies) whether the received information on one or more (alternatively, a plurality of) terminals which is charging through the wireless charging equipment 300 is included in the sharing target information.

As an example, the first terminal 200 determines whether the received telephone numbers of the plurality of terminals (alternatively, the identification information of the plurality of terminals) is included in pre-selected sharing target information (for example, sharing target information including telephone numbers of the second terminal, the third terminal, and the fourth terminal) (S940).

As the determined result (alternatively, the verified result), when the received information on one or more (alternatively, a plurality of) terminals which is charging through the wireless charging equipment 300 is not included in the sharing target information, the first terminal 200 outputs information representing that the terminal corresponding to the sharing target information is not included in the received information on one or more (alternatively, a plurality of) terminals which is charging through the corresponding wireless charging equipment 300 (alternatively, information representing that a sharing target terminal included in the sharing target information is not charging through the corresponding wireless charging equipment 300) and deletes (alternatively, discards) or stores the corresponding information on one or more (alternatively, the plurality of) terminals. In this case, the wireless charging equipment 300 continuously performs the charging function with the first terminal 200.

As an example, when the received telephone numbers of the plurality of terminals (for example, including telephone numbers of a fifth terminal and a sixth terminal) are not included in the pre-selected sharing target information (for example, the sharing target information including the telephone numbers of the second terminal, the third terminal, and the fourth terminal), the first terminal 200 continuously performs the charging function with the wireless charging equipment 300 and outputs information representing that the sharing target terminal included in the sharing target information is not charging through the corresponding wireless charging equipment 300 (S950).

Further, as the determined result, when the received information on one or more (alternatively, the plurality of) terminals which is charging through the corresponding wireless charging equipment 300 is included in the sharing target information, the first terminal 200 verifies the second terminal 400 as a specific terminal which is charging through the wireless charging equipment 300 in the sharing target information. Here, the specific terminal may be one or more (alternatively, a plurality of) terminals.

Further, the first terminal 200 exchanges connection condition information (alternatively, access condition information/communication mode information) with the verified second terminal 400 via the wireless charging equipment

300 (alternatively, through the wireless charging equipment 300). Here, the connection condition information may include any one communication mode among wireless communication modes such as Bluetooth and a WiFi mode. In this case, only when the second terminal 400 pre-permits (alternatively, admits) the content reception, a process of exchanging the connection condition information between the first terminal 200 and the second terminal 400 may be performed.

As such, the first terminal 200 and the second terminal 400 exchange the connection condition information with each other through the wireless charging equipment 300. Further, the first terminal 200 and the second terminal 400 determine (alternatively, sets) final connection condition information by exchanging the corresponding connection condition information with each other.

As an example, when the received telephone numbers of the plurality of terminals (for example, including telephone numbers of the second terminal and the fifth terminal) are included in the pre-selected sharing target information (for example, the sharing target information including the telephone numbers of the second terminal, the third terminal, and the fourth terminal), the first terminal 200 continuously performs the charging function with the wireless charging equipment 300 and transmits connection condition information of a WiFi scheme to the second terminal 400 via the wireless charging equipment 300. Thereafter, the second terminal 400 transmits response information (for example, acceptance/permission of the connection condition information of the WiFi scheme) representing whether to accept the received connection condition information of the WiFi scheme to the first terminal 200 via the wireless charging equipment 300. Thereafter, the first terminal 200 determines the final connection condition information (for example, the connection condition information of the WiFi scheme) based on the response information transmitted from the second terminal 400 (S960).

Thereafter, the first terminal 200 directly communicates with (alternatively, accesses/is connected with) the second terminal 400 based on the verified final connection condition information. In this case, the first terminal 200 and the second terminal 400 may directly communicate with each other through the dedicated app pre-installed in each terminal.

As an example, the first terminal 200 directly communicates with the second terminal 400 by the WiFi scheme through the preinstalled dedicated app.

Further, the first terminal 200 transmits one (alternatively, one or more/a plurality of) sharing content(s) selected above to the second terminal 400.

Further, the second terminal 400 receives one (alternatively, one or more/a plurality of) content(s) from the first terminal 200 and stores one (alternatively, one or more/a plurality of) received content(s). In this case, only when the second terminal 400 pre-permits (alternatively, admits) the content reception, the second terminal 400 may receive one (alternatively, one or more/a plurality of) content(s) transmitted from the first terminal 200. In addition, while the corresponding second terminal 400 does not pre-permit the content reception, a direct connection process with the first terminal 200 is not performed or one (alternatively, one or more/a plurality of) content(s) transmitted from the first terminal 200 is immediately discarded (alternatively, deleted) or not stored.

As an example, the first terminal 200 transmits the selected ∘∘ image to be shared to the second terminal 400 through the dedicated app. Thereafter, the second terminal 400 receives the ∘∘ image transmitted from the first terminal 200 through the dedicated app, stores the received ∘∘ image, and display the ∘∘ image through the dedicated app (S970).

Figure 10:
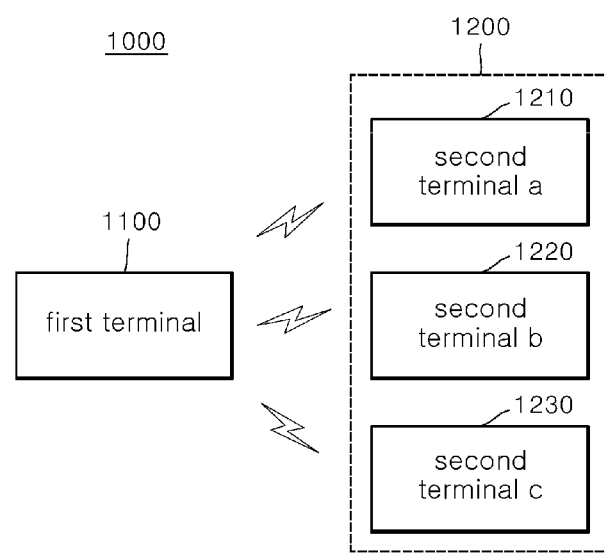
FIG. 10 is a schematic configuration view for describing a content sharing system according to an embodiment of the present invention.

FIG. 10 is a schematic configuration diagram for describing a content sharing system (alternatively, a wireless charging system) according to an embodiment of the present invention.

Referring to FIG. 10, the content sharing system 1000 (alternatively, the wireless charging system) according to the embodiment of the present invention means a system that supports content sharing between multiple terminals 1100 and 1200. The content sharing system according to the embodiment of the present invention may be configured to include a first terminal 1100 that intends to share contents and a second terminal 1200 that may share the contents. Further, the content sharing may be performed between the terminals 1100 and 1200 which are wirelessly charged.

The first terminal 1100 may sense one or more second terminals 1200 positioned within a predetermined radius and support a connection process with the second terminal 1200. In particular, the second terminal 1200 according to the embodiment of the present invention may exist in plural. When a plurality of connectable second terminals 1200 are detected, the first terminal 1100 may select an optimal second terminal 1200 among the plurality of second terminals 1200 and transmit and share the contents after establishing connection with the selected second terminal 1200.

For example, when the plurality of second terminals, that is, second terminal a 1210, second terminal b 1220, and second terminal c 1230 are detected, the first terminal 1100 may select the optimal second terminal, for example, the second terminal c 1230 by considering content related information including a content reproduction condition, for example, the kind, the type, reproduction information, and the like of the contents, time information, and the like, and may transmit and share the content after establishing the connection with the selected second terminal c 1230.

A content sharing method between the first terminal 1100 and the second terminal 1200 will be described below in more detail and the first terminal 1100 and the second terminal 1200 according to the embodiment of the present invention may be implemented in various forms. For example, the first terminal 1100 and the second terminal 1200 may adopt fixed terminals such as a smart TV, a desktop computer, and the like as well as mobile terminals such as a smart phone, a tablet PC, a personal digital assistants (PDA), a portable multimedia player (PMP), an MP3 player, a navigation, and the like.

Further, the first terminal 1100 and the second terminal 1200 may be implemented in a homogeneous form, but implemented in a heterogeneous form. For example, the first terminal 1100 may be the smart phone and the second terminal 1200 may be the smart TV. In the case of the first terminal 1100 and the second terminal 1200 of the present invention, modification of a portable apparatus is very diversified with the tendency of convergence of a digital apparatus and all portable apparatuses may not be enumerated, but units at levels equivalent to the levels the mentioned units may adopt the first terminal 1100 and the second terminal 1200 according to the present invention.

Moreover, the first terminal 1100 and the second terminal 1200 according to the embodiment of the present invention may transmit and receive various data via a communication network according to an operation of a user. Further, the first terminal 1100 and the second terminal 1200 may perform voice or data communication according to an implementation scheme thereof and transmit and receive various pieces of information with a separate web server. Further, in order to support the process, the first terminal 1100 and the second terminal 1200 may include a memory storing a browser, a program, and a protocol for transmitting and receiving information, a microprocessor for calculating and controlling various programs by executing various programs, and the like. In this case, the microprocessors installed in the first terminal 1100 and the second terminal 1200 may process a program command for executing the method according to the embodiment of the present invention. In one implementation example, the processor may be a single-threaded processor and in another implementation example, the processor may be a multi-threaded processor. Furthermore, the processor may process a command stored in the memory or a storage device.

Moreover, the first terminal 1100 and the second terminal 1200 according to the embodiment of the present invention may preferably transmit and receive various pieces of associated information through a short-distance wireless communication scheme. For example, the first terminal 1100 and the second terminal 1200 may perform communication by using the short distance wireless communication scheme such as WiFi, Bluetooth, Zigbee, radio frequency identification (RFID), and near field communication (NFC).

Moreover, the first terminal 1100 and the second terminal 1200 according to the embodiment of the present invention may use two communication schemes in parallel. For example, the first terminal 1100 may sense and connect one or more second terminals 1200 by using the NFC communication scheme and transmit contents to the second terminal 1200 according to the WiFi communication scheme. Hereinafter, a primary configuration and an operating method of the terminal according to an embodiment of the present invention will be described.

Figure 11:
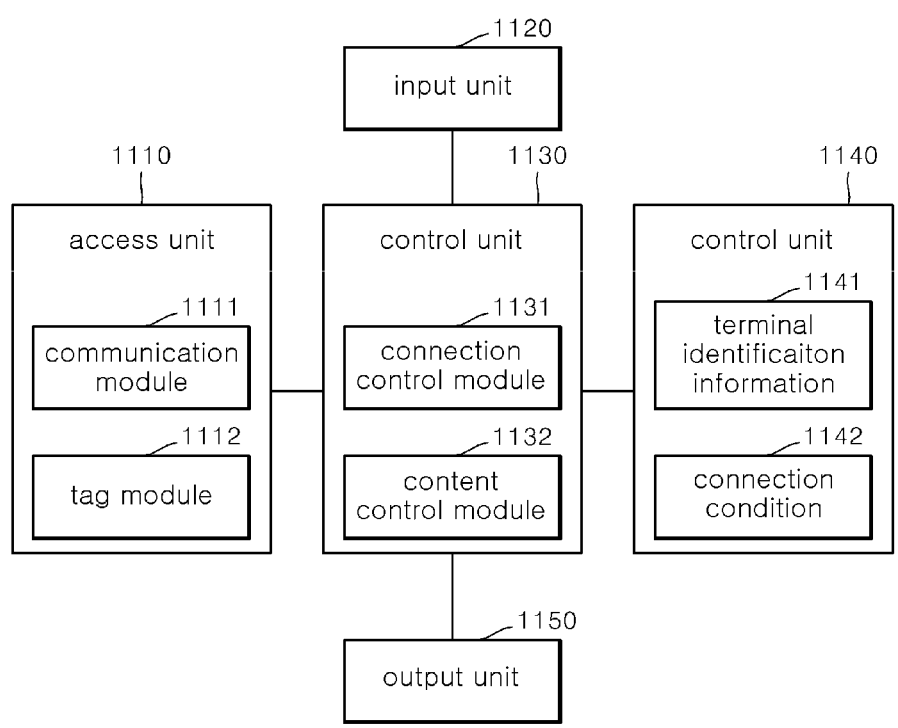
FIG. 11 is a block diagram for describing a main configuration of a first terminal according to the embodiment of the present invention.

FIG. 11 is a block diagram illustrating a primary configuration of a first terminal according to an embodiment of the present invention.

Prior to describing the primary configuration with reference to FIG. 11, the primary configuration of the terminal based on the first terminal 1100 that intends to share the contents is described for easy description, but the present invention is not limited thereto and the second terminal 1200 may be configured similarly.

Referring to FIGS. 10 and 11, the terminal according to the embodiment of the present invention may be configured to include a connection unit 1110, an input unit 1120, a control unit 1130, a storage unit 1140, and an output unit 1150.

When the respective components are described in more detail, first, the connection unit 1110 serves to sense one or more connectable second terminals 1200 and support the connection. Further, the connection unit 1110 may serve to transmit a message for establishing connection to the second terminal 1200 selected by the control unit 1130 and transmit the contents to the connected second terminal 1200 when the connection with the second terminal 1200 is completed.

In particular, the connection unit 1110 according to the embodiment of the present invention may be configured to include a communication module 1111 and a tag module 1112. The communication module 1111 is a module supporting various wired/wireless communication schemes and the tag module 1112 means a module that supports an electronic tag. Here, the electronic tag may support the short distance wireless communication schemes such as the RFID communication and the NFC communication. In particular, in the embodiment of the present invention, using the NFC communication scheme will be described as an example.

The NFC is a technology as short distance wireless communication that uses a specific frequency domain which is 13.56 Mhz and transmits data with low power within a short distance (within 10 km), which has an advantage to accurately determine the will of the user, that is, whether the user selects whether to use the NFC communication.

In order to use the electronic tag, preferably, any one terminal of the first terminal 1100 and the second terminal 1200 includes a reader unit that may read a tag and any one terminal preferably includes a tag unit that may be read by the reader unit. In the embodiment of the present invention, it will be described assumed that the second terminal 1200 includes the tag unit and the first terminal includes the reader unit that may read the tag of the second terminal 1200.

Further, the connection unit 1110 according to the embodiment of the present invention may use a communication scheme for different connections and a communication scheme for transmitting the contents in parallel. For example, in order to sense one or more second terminals positioned within the predetermined radius, the connection unit 1110 may use the tag module 1112. Further, the connection unit 1110 may read identification information of the second terminal 1200 through the tag module 1112 and perform a connection process with the second terminal 1200 selected by the control unit 1130. In addition, the connection unit 1110 may transmit the contents to the second terminal 1200 connected thorough the communication module 1111.

The input unit 1120 transfers various pieces of information such as number and text information input from the user and signals input associated with various function setting and control of a function of the terminal to the control unit 1130. In particular, the input unit 1120 of the present invention may support user inputs for setting an initial connection condition to correspond to one or more second terminals 1200. Further, the input unit 1120 of the present invention may support various types of user inputs.

The input unit 1120 may include key input means such as a keyboard or a keypad, touch input means such as a touch sensor or a touch pad, voice input means, and gesture input means configured to include at least one of a gyro sensor, a terrestrial magnetic sensor, an acceleration sensor, a proximity sensor, and a camera.

Besides, the input unit 1120 may include all types of input means which is currently developed or may be developed afterwards.

The control unit 1130 which performs general control of the terminal according to the embodiment of the present invention may be configured to include at least one processor including a central processing unit (CPU)/micro processing unit (MPU), an execution memory (for example, a register and/or a random access memory (RAM)) to which at least one memory loading datum is loaded, and a bus inputting/outputting at least one datum in/from the processor and the memory in terms of hardware. Further, the control unit 1130 may be configured to include a predetermined program routine or program data which is loaded to the execution memory from a predetermined recording medium and calculated by the processor in order to a function (for example, a connection and content sharing function of the second terminal 1200) defined in the terminals 1100 and 1200 in terms of software. In other words, a component which may be processed in terms of the software among the function provided in the terminal may be determined as a function of the control unit 1130 in order to process the content sharing method according to the embodiment of the present invention.

The control unit 1130 of the present invention is functionally connected with at least one component provided to support the content sharing method according to the embodiment of the present invention. That is, the control unit 1130 is functionally connected with the connection unit 1110, the input unit 1120, the storage unit 1140, and the output unit 1150 and controls the flow of signals for supplying power to each component and performing the function of each component.

In particular, the control unit 1130 according to the embodiment of the present invention may first serve to sense one or more connectable second terminals 1200 and support the connection.

The control unit 1130 determines whether the identification information of the second terminal 1200 is registered identification information when one or more second terminals 1200 which approach within a predetermined radius are scanned through the connection unit 1110 and the identification information of the scanned second terminal 1200 is transferred from the connection unit 1110. According to a result of the determination, when the identification information of the second terminal 1200 is the registered identification information, the control unit 1130 determines the second terminal 1200 as the connectable terminal. In addition, when identification information of another second terminal 1200 is received from the connection unit 1110 within a predetermined time range, the control unit 1130 determines whether the identification information of another second terminal 1200 is the registered identification information similarly and when the identification information of another second terminal 1200 is the registered identification information, the control unit 1130 determines another second terminal 1200 as the connectable terminal. Herein, the predetermined time range may be preferably a time range between several seconds to several minutes.

In addition, the control unit 1130 determines whether the connectable second terminal 1200 exists in plural. When the plurality of connectable second terminals 1200 exist, the control unit 1130 may perform a process of selecting an optimal second terminal 1200 by comparing predetermined connection conditions and content reproduction conditions for reproducing the contents to correspond to the second terminals 1200, respectively.

In more detail, first, the control unit 1130 stores and manages information on a connection condition to correspond to the connectable second terminal 1200 in advance. Here, the connection condition may be any one of access information, positional information, service information, and specification information for establishing the connection. First, the access information may be identification information including an ID and a password for connection to the terminal. When an in-house is described as an example, the positional information as information on a location at which the second terminal 1200 is positioned may be information indicating whether the second terminal is positioned in a living room, whether the second terminal is positioned in a main room, and the like. The service information as information on a service supported by the second terminal 1200 may include, for example, information notifying that the second terminal 1200 is the smart TV when the second terminal 1200 is the smart TV. Further, the service information may include even information on a communication scheme supported to receive the contents by the second terminal 1200. For example, the service information may be information indicating whether to support the WiFi communication scheme at the time of receiving the contents, and the like. Further, the specification information as information associated with a specification of the second terminal 1200 may be, for example, information associated with hardware such as resolution information, a communication speed, and the like supported by the second terminal 1200.

While the control unit 1130 stores the information on the connection condition in advance, the control unit 1130 compares the prestored connection condition and the a content reproduction condition in a current state to correspond to each second terminal 1200 in order to select the optimal second terminal 1200 among the plurality of second terminals 1200. Herein, the content reproduction condition may content related in formation including any one of the kind, the type, and reproduction information of contents to be reproduced and current time information. Here, the kind of the contents may mean information on the kind of the contents such as a movie, a game, and the like and the type may be other information set in the contents, for example, permitted age information, information such as violence, and the like. When the contents are the movie, the reproduction information may be time information regarding a reproduced movie and when the contents are the game, the reproduction information may be information associated with the progress of the game. In addition, the time information means time information regarding a current time.

As such, the control unit 1130 selects the optimal second terminal 1200 by comparing the prestored connection condition and the content reproduction condition in the current state to correspond to each second terminal 1200 in order to select the optimal second terminal 1200 among the plurality of second terminals 1200. For example, the contents which are currently reproduced may be viewed by 19 years old or more and contents having multiple violence and further, when the current time is 11 p.m., the user will continuously enjoy the contents in a restricted environment rather than an exposed environment. In this case, the control unit 1130 may select the second terminal 1200 which is the tablet PC positioned in a small room among the plurality of second terminals 1200 as the optimal second terminal 1200.

As another example, the contents which are currently reproduced are the game contents and may be used by the whole family and when the current time is afternoon, the control unit 1130 may be positioned in the living room among the plurality of second terminals 1200 and select the second terminal 1200 which is the smart TV having an excellent specification as the optimal second terminal 1200.

Moreover, when the control unit 1130 compares the predetermined connection conditions and the content reproduction conditions to correspond to the second terminals 1200, respectively, the control unit 1130 further compares user preference information in addition thereto to select the optimal second terminal 1200. For example, when the user uses the tablet PC more frequently than the smart TV in usual, the control unit 1130 may select the second terminal 1200 corresponding to the tablet PC as the optimal second terminal 1200.

Then, the control unit 1130 may transmit a message defined for establishing the connection to the selected second terminal 1200. In this case, the control unit 1130 may transmit the defined message including the contents. In particular, the control unit 1130 according to the embodiment of the present invention may transmit the message including only contents regarding residual parts other than the content part which is currently reproduced up to now.

Here, the defined message may be, for example, an NDEF message supported in the NFC communication scheme. The NDEF message will be described with reference to FIG. 12.

Figure 12:
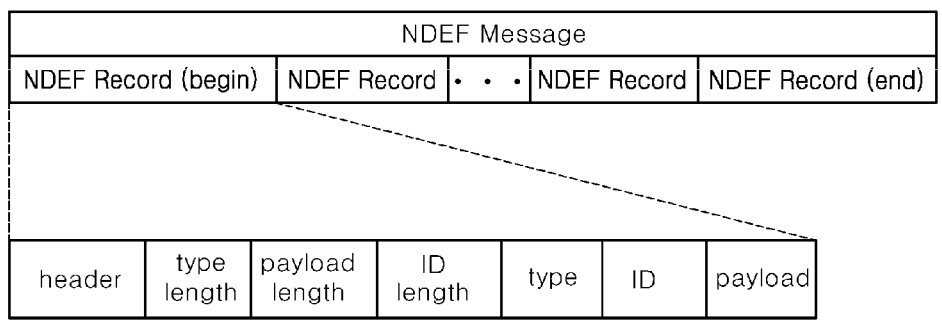
FIG. 12 is an exemplary diagram for describing a message defined according to the embodiment of the present invention.

FIG. 12 is an exemplary diagram for describing a message defined according to the embodiment of the present invention.

Referring to FIG. 12, the NDEF message according to the embodiment of the present invention includes one or more NDEF records. The NDEF record is a part in which substantial data are stored and includes information on the content which is currently reproducing in the embodiment of the present invention. Further, the NDEF record may be implemented by items such as a record header, a type length, a payload length, an ID length, a type, an ID, and a payload.

The items constituting the NDEF record will be defined as follows in more detail.

TABLE 1

| Item | Length | Description |
| --- | --- | --- |
| Record header | 1 byte | Basic information on record |
| Type length | 1 byte | Length of data type |
| Payload length | 1 byte or 4 byte | Length of payload |
| ID length | 1 byte | Length of ID |
| Type | Type length byte | Type of payload stored in record |
| ID | ID length byte | Payload ID |
| Payload | Payload length byte | Payload stored in record |

Referring back to FIG. 11, furthermore, the control unit 1130 according to the embodiment of the present invention may transmit only the remaining contents except for the contents which are reproduced up to now in the NDEF message when the NDEF message is transmitted to the second terminal 1200.

For example, the content is a content for a movie of about 2 hours, and when the movie of 1 hour is reproduced up to now, the terminal does not transmit all the contents to be included in the NDEF message to the selected second terminal 1200, but may transmit only the content for the remaining 1 hour to be included in the NDEF message.

In order to support the aforementioned operation, the control unit 1130 of the present invention may be constituted by including a connection control module 1131 and a content control module 1132. The connection control module 1131 serves to detect the plurality of second terminals 1200 and support a connection process with any one second terminal 1200 which is optimally selected as described above. The content control module 1132 serves to transmit the content which is currently reproducing to the connected second terminal 1200.

The storage unit 1140 may temporarily store various data generated while executing an application program including application program required for a functional operation according to the embodiment of the present invention. Particularly, the storage unit 1140 according to the embodiment of the present invention may store terminal identification information 1141 on one or more second terminals 1200 and a connection condition 1142 corresponding to the terminal identification information 1141. Further, various information related with the content may be stored.

The storage unit 1140 may largely include a program area and a data area. The program area stores related information for driving the terminal such as an operation system (OS) for booting the terminal. The data area is an area where data generated according to a use of the terminal are stored and may store the terminal identification information 1141, the information on the connection condition 1142, and the information on the content as described above. The storage unit 1140 may be constituted by including a storage medium such as a flash memory, a hard disk, a multimedia card micro type memory (for example, an SD or XD memory, and the like), an RAM, and a ROM.

The output unit 1150 outputs information on a series of operation states and operation results generated while the terminal executes the function. The output unit 1150 may be constituted by including a display module and a sound source output module. The display module may constituted by a liquid crystal display (LCD), a thin film transistor LCD (TFT-LCD), an organic light emitting diode (OLED), a light emitting diode (LED), an active matrix organic LED (AMOLE), a flexible display, and a 3 dimension display, and the like. Further, among the displays, some displays may be configured as a transparent or optical transmissive type so as to view the outside through some displays. This is constituted by a transparent display type including a transparent OLED (TOLED).

As such, main constituent elements of the terminal will be described with reference to FIG. 11. However, constituent elements illustrated in FIG. 11 are not required constituent elements and the terminal may be implemented by more constituent elements than the constituent elements illustrated and may be implemented by less constituent elements therethan. For example, when the terminal is implemented by a set-top box, the output unit 1150 may be omitted.

Further, positions of the main constituent elements of the terminal illustrated in FIG. 11 may be changed in any degree for convenience or for other reasons. Further, as the modules configuring the control unit 1130, only the connection control module 1131 and the content control module 1132 are illustrated, but the modules are not limited thereto, and the control unit 1130 may be constituted by various modules performing various functions.

Hereinabove, the main configuration and operation method of the terminals 1100 and 1200 according to the embodiment of the present invention are described.

Hereinafter, a content sharing method according to an embodiment of the present invention will be described with reference to FIGS. 13 to 16.

Prior to the description, as described above, it is described under the assumption that the first terminal 1100 is a terminal which requests the content to be continuously reproduced by transmitting the content while reproducing to the second terminal 1200 while the content is reproducing and the second terminal 1200 receives the content from the first terminal 1100 and is a terminal which may subsequently reproduce a next part after the first terminal 1100 reproduces the content.

Figure 13:
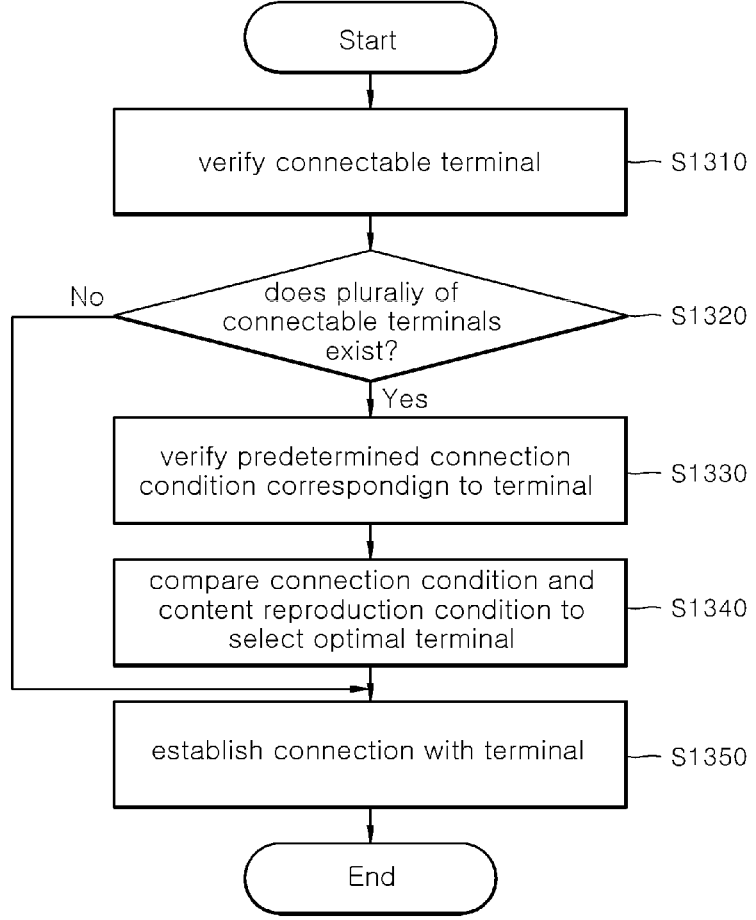
FIG. 13 is a flowchart illustrating a content sharing method according to a fourth embodiment of the present invention.

FIG. 13 is a flowchart illustrating a content sharing method according to a fourth embodiment of the present invention.

Referring to FIGS. 10 to 13, the content sharing method according to the embodiment of the present invention first verifies one or more second terminals 1200 to which a first terminal 1100 is connectable for content sharing (S1310). As the verified result, in the case where one or more connectable second terminals 1200 exist in plural (S1320), the first terminal 1100 verifies a predetermined connection condition corresponding to the plurality of second terminals 1200.

Thereafter, the first terminal 1100 compares the verified connection condition of the plurality of second terminals 1200 and a content reproduction condition for content reproducing to select an optimal second terminal 1200 (S1340) and establish connection with the selected second terminal 1200 (S1350).

The content sharing method according to the embodiment of the present invention will be described in more detail.

Figure 14:
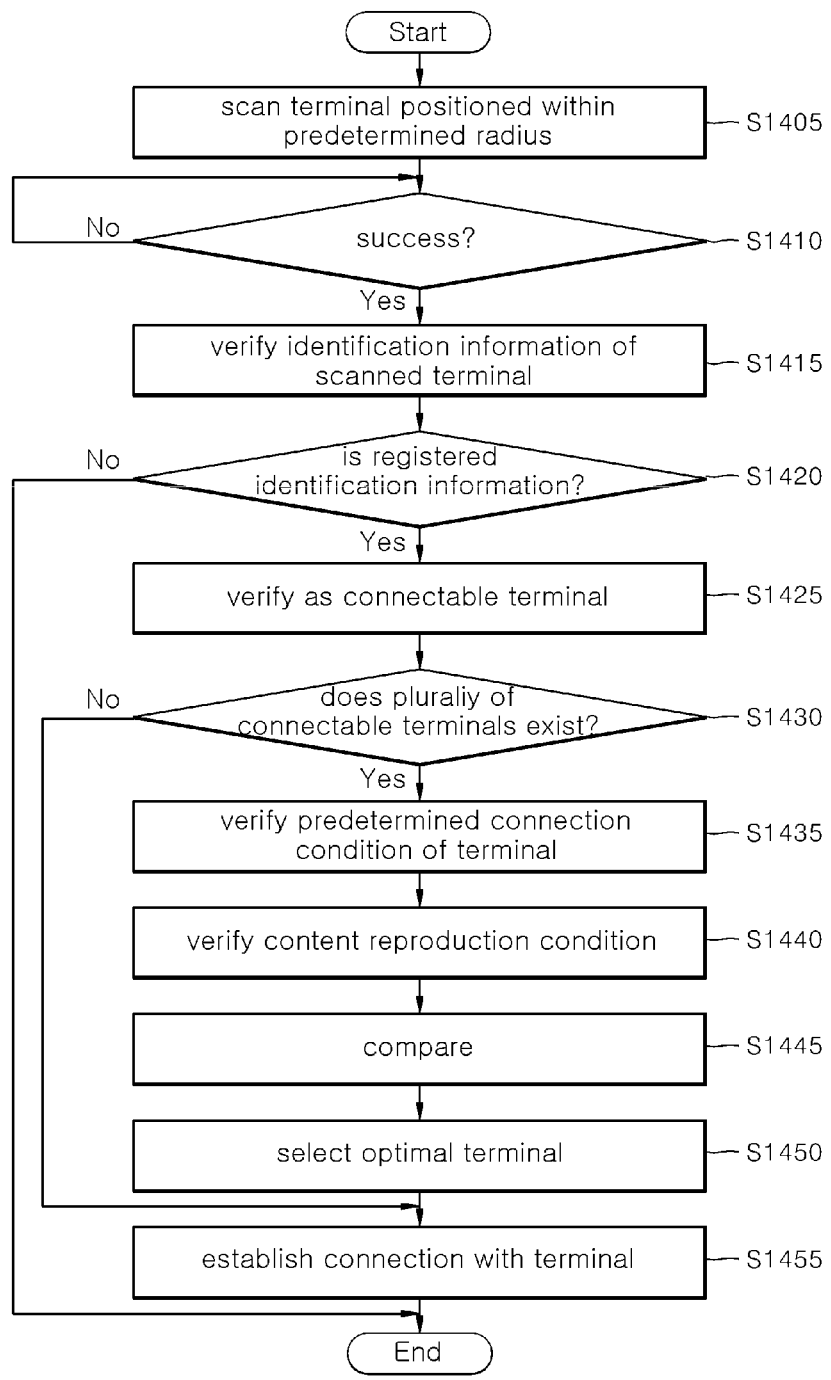
FIG. 14 is a flowchart illustrating a content sharing method according to a fifth embodiment of the present invention.

FIG. 14 is a flowchart illustrating a content sharing method according to a fifth embodiment of the present invention.

Referring to FIGS. 10 and 14, in order to detect one or more second terminals 1200 which are connectable with the first terminal 1100 to share the content, one or more second terminals 1200 positioned within a predetermined radius are scanned (S1405), and when a normal scanning process is performed (S1410), the second terminal 1200 transmits identification information capable of identify the second terminal 1200 to the first terminal 1100 according to the scanning process (S1415).

The scanning process may be performed through a short range wireless communication scheme as described above. In more detail, when a distance between the first terminal 1100 and the second terminal 1200 is positioned within the predetermined radius, the first terminal 1100 and the second terminal 1200 may transmit and receive information according to a supportable communication scheme, and the first terminal 1100 may read the identification information of the second terminal 1200. For example, when the first terminal 1100 and the second terminal 1200 transmits and receives the information by a Bluetooth communication scheme, the first terminal 1100 may read a Bluetooth MAC address from the second terminal 1200. Further, in the case where the first terminal 1100 and the second terminal 1200 transmits and receives the information by an NFC communication scheme, when an access unit of the first terminal 1100 and an access unit of the second terminal 1200 contact or approaches each other, the first terminal 1100 may read identification information provided in a tag of the second terminal 1200.

The first terminal 1100 receiving the information verifies the scanned identification information of the second terminal 1200 (S1415) and determines whether the identification information of the second terminal 1200 is registered identification information (S1420).

When the identification information of the second terminal 1200 is the registered identification information, the first terminal 1100 verifies the second terminal 1200 as the connectable terminal (S1425).

Here, the first terminal 1100 sets a predetermined time range, and when a scanning process with another second terminal 1200 is not detected within the predetermined time, in step S1425, the verified connection of the second terminal 1200 may be immediately established.

However, a plurality of second terminals 1200 to which the identification information is received within the predetermined time or according to the scanning process, and further, when the plurality of second terminals 1200 is all connectable terminals (S1430), the first terminal 1100 verifies a predetermined connection condition in response to each second terminal 1200 (S1435).

In this case, the first terminal 1100 stores the connection condition in response to the identification information of the second terminal 1200 and verifies the corresponding connection condition according to the verified identification information of the second terminal 1200.

Here, the connection condition may be constituted by including at least one of, for example, access information, position information, service information, and specification information, as the condition for establishing the connection with the second terminal 1200. The access information may be identification information including an ID and a password for connection to the terminal. The position information as information on a position where the second terminal 1200 is positioned may be information on whether the second terminal 1200 is positioned at a living room or in a main room when describing an in-house as an example. The service information as information on a service supported by the second terminal 1200 may include information notifying a smart TV, for example, when the second terminal 1200 is the smart TV. Further, information on a communication scheme supporting for the content reception of the second terminal 1200 may be included therein. For example, information on whether a WiFi communication scheme is supported when receiving the content may be included. Further, the specification information as information related with specification of the second terminal 1200 may be, for example, information related with hardware such as resolution information and a communication velocity which is supported by the second terminal 1200.

In addition, the first terminal 1100 verifies a content reproduction condition (S1440). Here, the content reproduction condition may include content related information including any one of a content kind to be reproduced, a type, and reproduction information and current time information. Here, the content kind means information on a content kind such as a movie and a game, and the type may be other information set in the content, for example, available age information, information such as violence. The reproduction information may be time information on a reproduced movie and the like when the content is a movie, and maybe information related with game progressing and the like when the content is a game. In addition, the time information means time information on a current time point.

Furthermore, in the embodiment of the present invention, it is exemplified that the first terminal 1100 first verifies the connection condition and verifies the content reproduction condition, but the present invention is not limited thereto, and the first terminal 1100 may simultaneously verify the connection condition and the content reproduction condition or first verify the content reproduction condition.

In addition, the first terminal 1100 compares the verified connection condition and content reproduction condition (S1445) and selects an optimal terminal (S1450). For example, the content while currently reproducing may be watched over 19 years old and a content having a full of violence, and further, when the current time is 11 p.m, a user wants to subsequently view the content in a limited environment rather than an exposed environment. In this case, the first terminal 1100 may select the second terminal 1200 which is a tablet PC positioned in a small room among the plurality of second terminals 1200 as the optimal terminal.

Further, when the content while currently reproducing is a sound source, a second terminal 1200 having the most excellent specification related with the sound source reproduction among the plurality of second terminals 1200 as the optimal terminal.

The first terminal 1100 establishes the connection with the selected terminal when the optimal terminal is selected (S1455) and may transmit the content to the connected terminal. Here, the first terminal 1100 according to the embodiment of the present invention does not transmit all the contents, but may transmit only the rest of the contents except for the currently reproduced content. Further, when the same game content is stored in the first terminal 1100 and the second terminal 1200, the first terminal 1100 may transmit only the information related with the game progressing to the second terminal 1200.

Furthermore, in the embodiment of the present invention, preferably, the information may be transmitted and received by the NFC communication scheme.

This will be described with reference to FIG. 15.

Figure 15:
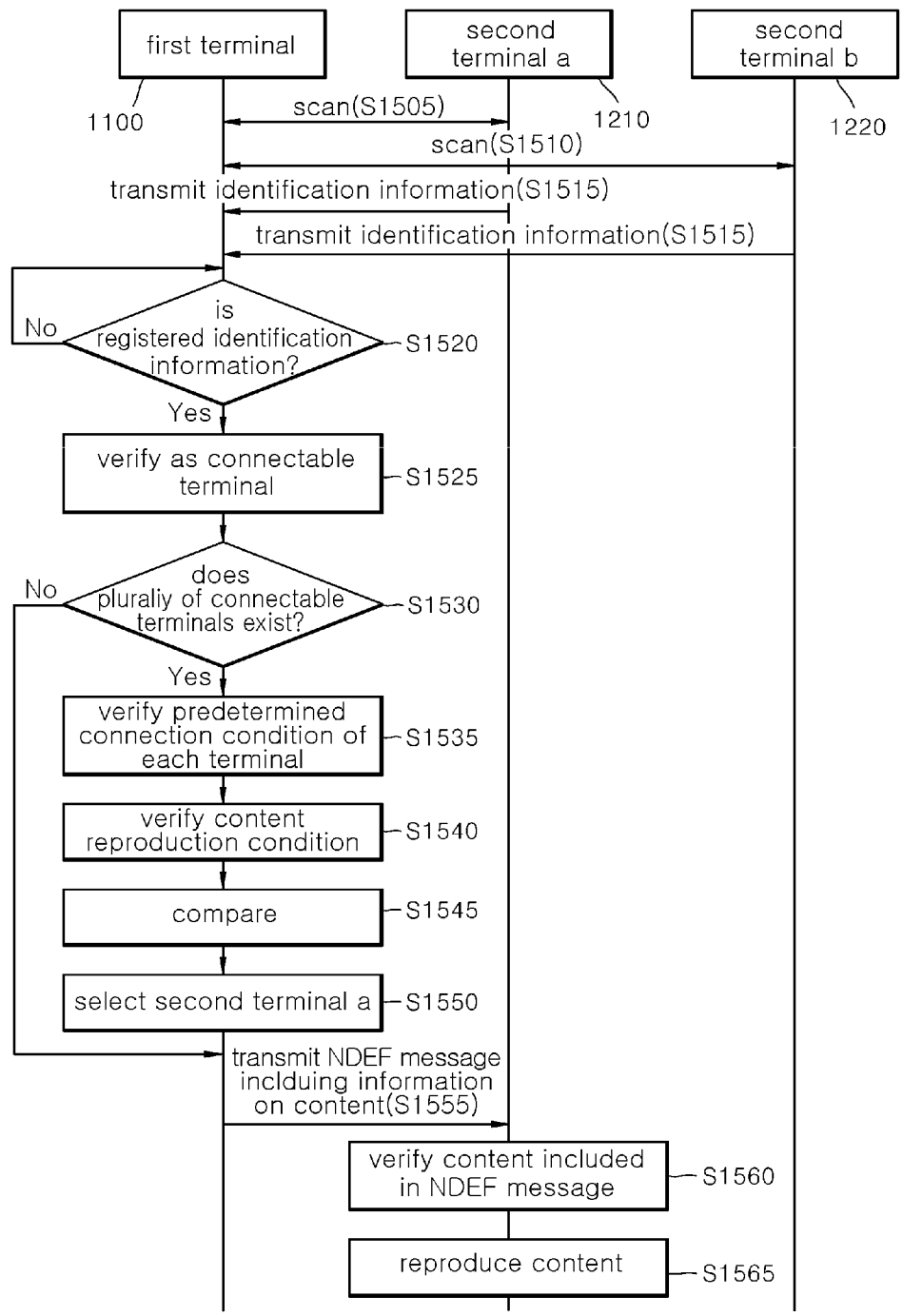
FIG. 15 is a flowchart illustrating a content sharing method according to a sixth embodiment of the present invention.

Referring to FIG. 15, the first terminal 1100 performs a process of scanning one or more second terminals, that is, a second terminal a 1210 and a second terminal b 1220 which are positioned in a predetermined radius (S1505 to S1510). The scanning process is performed when the distance between the first terminal 1100, the second terminal a 1210, and the second terminal b 1220 is within the predetermined range, or may be performed by contacting the access unit of the first terminal 1100 and the access units of the second terminal a 1210, and the second terminal b 1220 supporting the NFC communication scheme. To this end, each terminal may include any one of an NFC tag and a reader capable of reading the NFC tag.

In addition, as the scanning process is performed, each of the second terminal a 1210 and the second terminal b 1220 transmits the identification information capable of identifying each second terminal to the first terminal 1100. Thereafter, the first terminal 1100 determines whether the received identification information is registered identification information.

As the determined result, when the received identification information is the registered identification information, the first terminal 1100 determines the corresponding second terminal as the connectable terminal (S1525).

In addition, the first terminal 1100 determines whether connectable terminals include a plurality of terminals.

In the case of the registered connectable terminal, the first terminal 1100 verifies a predetermined connection condition to each terminal (S1535). In addition, the first terminal 1100 verifies the content reproduction condition for the current content reproduction (S1540), compares the connection condition and the content reproduction condition which are pre-set in each terminal (S1545), and selects the optimal terminal (S1550).

For example, when the second terminal a 1210 is an MP3 player, the second terminal b 1220 is a smart TV, and the content while reproducing in the first terminal 1100 is the sound source, the first terminal 1100 may select the second terminal a 1210 having the optimal specification for outputting the sound source. In addition, the first terminal 1100 transmits an NDEF message including information on the content to the second terminal a 1210 (S1555).

In this case, when the first terminal 1100 may transmit all of the contents, but reproduces the contents, the first terminal 1100 may transmit only the remaining part except for the currently reproduced content part included in the NDEF message to the second terminal a 1210.

The second terminal a 1210 receiving the remaining part verifies the content included in the NDEF message (S1560) and may reproduce the content (S1565).

As described above, according to the content sharing method according to the embodiment of the present invention, it is possible to increase user convenience by performing connection with a second terminal, in the case where identification information of the detected second terminal is identification information pre-registered in the first terminal to share the contents when a connectable second terminal is detected while the identification information is pre-registered between terminals to more easily share the contents among the terminals.

Further, it is possible to reproduce the contents under an optimal condition by selecting an optimal second terminal and performing connection with the selected second terminal by comparing a content reproduction condition for reproducing contents and a predetermined connection condition corresponding to each second terminal, when a plurality of connectable second terminals is detected.

Further, by using the NDEF message supported by the NFC communication scheme, all the contents are not transmitted when transmitting the content, but only some contents may be partially transmitted, and as a result, it is possible to more efficiently use the communication source when transmitting the content.

Furthermore, in order to use the content sharing method according to the embodiment of the present invention, the first terminal 1100 needs to pre-store the information on one or more connectable second terminals 1200.

Figure 16:
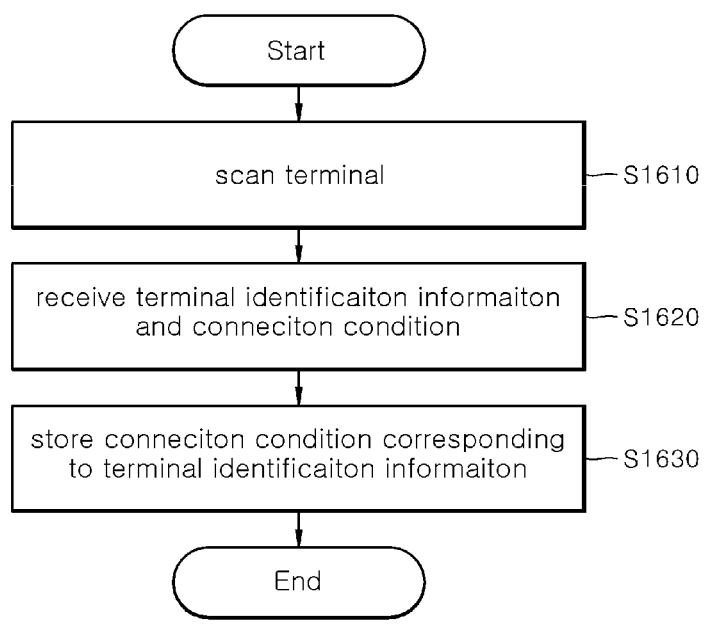
FIG. 16 is a flowchart illustrating a content sharing method according to a seventh embodiment of the present invention.

That is, as illustrated in FIG. 16, the first terminal 1100 scans the second terminal 1200 to be connected (S1610) and may receive the terminal identification information and the connection condition information from the second terminal 1200 (S1620).

In addition, the first terminal 1100 may store the connection condition in response to the terminal identification information (S1630), and while the connection condition on one or more connectable terminals is pre-stored, the content sharing method may be used in the embodiment of the present invention.

The wireless charging equipment, the terminal, and the wireless charging system comprising the same according to the embodiment of the present invention may be prepared with a computer program, and codes and code segments configuring the computer program may easily deduced by a computer programmer in the art. Further, the corresponding computer program is stored in the non-transitory computer readable storage medium, and read and executed by the computer or the wireless charging equipment, the terminal (alternatively, user equipment) including the PRU, the service providing device, the second terminal, and the like to implement the wireless charging equipment, the terminal, and the wireless charging system comprising the same.

The non-transitory computer readable storage medium includes a magnetic storage medium, an optical storage medium, and a carrier wave medium. The computer program implementing the wireless charging equipment, the terminal, and the wireless charging system comprising the same according to the embodiment of the present invention may be stored and installed in embedded memories of the wireless charging equipment, the terminal (alternatively, the user equipment) including the PRU, the service providing device, the second terminal, and the like. Alternatively, external memories of a smart card and the like which store and install the computer program implementing the wireless charging equipment, the terminal, and the wireless charging system comprising the same according to the embodiment of the present invention may be installed in the wireless charging equipment, the terminal (alternatively, the user equipment) including the PRU, the service providing device, the second terminal, and the like through an interface.

As described above, according to the present invention, it is possible to conveniently share contents (for example, including multimedia contents, a business card, profile information, and the like) on a cloud by easily sharing information on a remote place based on a wireless charging situation and a cloud service.

Further, as described above, according to the present invention, it is possible to enlarge an application range of the wireless charging system and improve convenience of usage by transmitting sharing link information and identification information of one or more second terminals to the wireless charging equipment in a terminal, verifying the access to a corresponding second terminal in the wireless charging equipment to provide the sharing link information to the corresponding second terminal, and storing the sharing link information in the second terminal or downloading contents corresponding to the sharing link information, in the case where the terminal acquiring the sharing link information provided from the service providing device is charged in the wireless charging equipment.

Further, as described above, according to the present invention, it is possible to increase an advertisement effect and increase sales according to substantial purchase by providing a coupon usable in a corresponding store to a second terminal which is charging in the wireless charging equipment, in the case where the terminal getting a coupon provided from the service providing device is charged through the wireless charging equipment provided in the store to induce friends including the terminals to the store where the wireless charging equipment is provided.

Further, as described above, according to the present invention, it is possible to enlarge an application range of the wireless charging system and improve convenience of usage by registering a coupon usable in a store where the corresponding wireless charging equipment is installed which is provided from a terminal which is charging through the corresponding wireless charging equipment to a dedicated app installed in a second terminal in the second terminal which is charging through the wireless charging equipment.

Further, as described above, according to the present invention, it is possible to conveniently share the content stored in the first terminal, enlarge an application range of the wireless charging system, and improve convenience of usage by sharing data among a plurality of terminals which is charging through the wireless charging equipment.

Further, as described above, according to the present invention, it is possible to enhance usability by providing a method of directly exchanging mass data among the plurality of terminals which is charging through the wireless charging equipment to efficiently share information and share a file among many terminals of the same user.

Further, the present invention can be widely used in a wireless charging system field, an advertisement/public relations/marketing field, and the like by transmitting sharing link information and identification information of one or more second terminals to the wireless charging equipment in a terminal, verifying the access to a corresponding second terminal in the wireless charging equipment to provide the sharing link information to the corresponding second terminal, and storing the sharing link information in the second terminal or downloading contents corresponding to the sharing link information, in the case where the first terminal acquiring the sharing link information provided from the service providing device is charged in the wireless charging equipment to conveniently share contents (for example, including multimedia contents, a business card, profile information, and the like) on a cloud, enlarge an application range of the wireless charging system, and improve convenience of usage.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to the above-described embodiments and the following claims as well as all modified equally or equivalently to the claims are intended to fall within the scope and spirit of the invention.

What is claimed is:

1. Wireless charging equipment comprising:
a communication unit configured to communicate based on a BLE scheme and receive sharing link information transmitted from a first terminal, sharing target information, and identification information of the first terminal; and
a control unit configured to determine whether identification information of a second terminal is included in the sharing target information when the identification information of the second terminal transmitted from the second terminal is received while the first terminal is wirelessly charging and control the communication unit to transmit the sharing link information to the second terminal when the identification information of a second terminal is included in the sharing target information.

2. The wireless charging equipment of claim 1, wherein the sharing link information includes address information of the service providing device in which a content selected by the first terminal from a plurality of contents pre-stored in the service providing device is stored.

3. The wireless charging equipment of claim 1, wherein the sharing target information includes any one of the identification information of one or more second terminals, a telephone number, and an e-mail address.

4. The wireless charging equipment of claim 1, wherein the control unit controls to delete or store the identification information of the second terminal and simultaneously, continuously perform a charging function with the second terminal when the identification information of the second terminal is not included in the sharing target information.

5. A control method of wireless charging equipment comprising:
receiving sharing link information transmitted from a first terminal, sharing target information, and identification information of the first terminal by means of a communication unit;
determining whether identification information of a second terminal is included in the sharing target information when receiving the identification information of the second terminal transmitted from the second terminal while the first terminal is wirelessly charging, by means of a control unit; and
transmitting the sharing link information to the second terminal by means of the communication unit, when the identification information of the second terminal is included in the sharing target information as the determined result.

6. A wireless charging system comprising:
a service providing device configured to transmit sharing link information on a selected content when one or more contents are selected from a plurality of prestored contents;
a first terminal configured to transmit sharing link information transmitted from the service providing device, sharing target information including information on one or more second terminals to share the sharing link information, and identification information;
wireless charging equipment configured to determine whether the identification information of the second terminal is included in the sharing target information when the identification information of the second terminal transmitted from the second terminal is received while the first terminal is wirelessly charging and transmit the sharing link information to the second terminal when the identification information of the second terminal is included in the sharing target information; and a second terminal configured to communicate with the service providing device corresponding to the sharing link information based on the sharing link information transmitted from the wireless charging equipment, request transmission of the content corresponding to the sharing link information to the service providing device, receive the content corresponding to the sharing link information transmitted from the service providing device in response to the request, and output the received content.

7. The wireless charging system of claim 6, wherein the content includes at least one of an image, an audio, a video, a motion picture, a game, map information provided from a map providing program, and a document file.

* * * * *